US009092303B2

(12) United States Patent
Leonard et al.

(10) Patent No.: US 9,092,303 B2
(45) Date of Patent: *Jul. 28, 2015

(54) DICTIONARY-BASED DEPENDENCY DETERMINATION

(71) Applicant: Microsoft Technology Licensing, LLC, Redmond, WA (US)

(72) Inventors: Arthur C. Leonard, Redmond, WA (US); Syed Muhammad Mujahid Hasan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/242,716

(22) Filed: Apr. 1, 2014

(65) Prior Publication Data
US 2014/0215438 A1 Jul. 31, 2014

Related U.S. Application Data

(63) Continuation of application No. 12/645,389, filed on Dec. 22, 2009, now Pat. No. 8,707,284.

(51) Int. Cl.
*G06F 9/44* (2006.01)
(52) U.S. Cl.
CPC .. *G06F 8/73* (2013.01); *G06F 8/20* (2013.01); *G06F 8/71* (2013.01)
(58) Field of Classification Search
USPC ........................................................ 717/163
See application file for complete search history.

(56) References Cited

U.S. PATENT DOCUMENTS

| 5,408,665 | A  | * | 4/1995  | Fitzgerald ..................... 717/163 |
| 5,878,262 | A  | * | 3/1999  | Shoumura et al. ............ 717/164 |
| 6,128,773 | A  |   | 10/2000 | Snider |
| 7,343,596 | B1 |   | 3/2008  | Geisinger |
| 7,581,215 | B1 | * | 8/2009  | Song et al. .................... 717/160 |
| 2004/0123280 | A1 | * | 6/2004 | Doshi et al. .................. 717/161 |
| 2004/0250246 | A1 |   | 12/2004 | Veselov et al. |
| 2005/0273398 | A1 |   | 12/2005 | Jameson |
| 2006/0164997 | A1 |   | 7/2006  | Graepel et al. |
| 2007/0074197 | A1 |   | 3/2007  | Buckley et al. |
| 2007/0294667 | A1 |   | 12/2007 | Caceres et al. |

OTHER PUBLICATIONS

Yan, et al., "An Approach to Discover Dependencies between Service Operations", In Journal of Software, vol. 3, Issue 9, Dec. 2008, pp. 36-43.

(Continued)

*Primary Examiner* — Ryan Coyer
(74) *Attorney, Agent, or Firm* — Kevin Sullivan; Kate Drakos; Micky Minhas

(57) ABSTRACT

Techniques are described herein for performing a dictionary-based dependency determination. For example, when a package is selected to be imported from a store (e.g., a database), a dictionary-based dependency operation may be performed to determine which elements of the package are dependent on other elements of the package. A dictionary includes indexes, each of which has at least one value. The indexes correspond to respective resources, and each value indicates an element of the package that produces the resource that corresponds to the respective index. If an element of the package consumes a resource, the indexes and corresponding values in the dictionary may be reviewed to determine which element(s) of the package produce that resource.

20 Claims, 13 Drawing Sheets

(56) References Cited

OTHER PUBLICATIONS

Chen, Xuejun, "Dependence Management for Dynamic Reconfiguration of Component-Based Distributed Systems", In Proceedings of the 17th IEEE International Conference on Automated Software Engineering, Sep. 23, 2002, 6 Pages.

Alda, et al., "Managing Dependencies in Component-Based Distributed Applications", A Revised Papers from the International Workshop on Scientific Engineering for Distributed Java Applications, Nov. 28, 2002, 11 Pages.

Mancoridis, et al., "Bunch: A Clustering Tool for the Recovery and Maintenance of Software System Structures", In IEEE International Conference on Software Maintenance, Sep. 1999, 10 Pages.

Kristiansen, et al., "Finding Upper Bounds for Dependencies between Software Components by using Bayesian Hypothesis Testing", Retrieved Date: Oct. 16, 2009, Available at: http://www.ia.hiof.no/prosjekter/hoit/html/nr1_04/monica.html, 12 pages.

"Final Office Action Received in U.S. Appl. No. 12/645,389", Mailed Date: Jan. 31, 2013, Filed Date: Dec. 22, 2009, 17 Pages.

"Non-Final Office Action Received in U.S. Appl. No. 12/645,389", Mailed Date: Jul. 19, 2012, Filed Date: Dec. 22, 2009, 14 Pages.

"Notice of Allowance Received in U.S. Appl. No. 12/645,389", Mailed Date: Dec. 4, 2013, Filed Date: Dec. 22, 2009, 25 Pages.

* cited by examiner

DICTIONARY-BASED DEPENDENCY DETERMINATION

CROSS-REFERENCE TO RELATED APPLICATION(S)

This application is a continuation of U.S. patent application Ser. No. 12/645,389, entitled "Dictionary-Based Dependency Determination," filed Dec. 22, 2009, which is incorporated herein by reference in its entirety.

BACKGROUND

A software development tool is a software application that software developers use to create, debug, maintain, or otherwise support other software applications or programs. Some examples of types of software development tools include but are not limited to performance analysis tools, debugging tools, static analysis and formal verification tools, correctness checking tools, memory usage tools, application building tools, etc. Some software development tools, such as integrated development environments (IDEs), combine the functionality of multiple types of software development tools into a single comprehensive tool. Such comprehensive tools are often used, among other purposes, to develop enterprise-level applications.

Many modern software development tools enable software developers to manipulate controls (a.k.a. web parts) and/or interact with pieces of content such as lists and documents to create customized solutions. A solution is defined as an application, a program, or an aspect thereof that is created using a software development tool. For example, a declarative language, such as extensible markup language (XML), may be used to generate a package. A package is a file that includes a plurality of other files. For instance, the package may serve essentially as a container for the other files. In accordance with this example, each file in the package includes markup that defines a respective element on which an operation may be performed on a processing system (e.g., a server, a desktop computer, a laptop computer, etc.) for implementing an application or a program. A software developer may use that package as a template and change the markup in the package to create a customized solution.

When a package is selected for importation from a store (e.g., a database), dependencies between elements that are defined by markup in the package are usually resolved in order for an operation to be successfully performed on the package. However, conventional techniques for determining dependencies typically are acyclical, meaning that if element A depends on element B, element B is not allowed to depend on element A. Such interdependency between elements usually results in an infinite loop during performance of an operation, rendering the customized solution unusable.

Moreover, conventional dependency determination techniques often are limited to one-to-one mapping between a single producer of a resource and a single consumer of that resource. For example, if element A produces a resource, and element B consumes the resource, element B is said to depend on element A. In accordance with this example, once the determination is made that element B depends on element A with respect to the resource, conventional dependency determination techniques typically are unable to determine that dependencies exist between element A and elements other than element B that consume the resource or between element B and elements other than element A that produce the resource.

Furthermore, when a software developer uses a package as a template for a customized solution, operations typically are performed on all elements that are defined by markup in the package. For example, conventional dependency determination techniques usually do not allow a software developer to choose whether an operation is performed on elements.

SUMMARY

Various approaches are described herein for, among other things, performing a dictionary-based dependency determination. For example, when a package is selected to be imported from a store (e.g., a database), a dictionary-based dependency operation may be performed to determine which elements of the package are dependent on other elements of the package. A dictionary includes indexes, each of which has at least one value. The indexes correspond to respective resources (i.e., properties), and each value indicates an element of the package that produces the resource that corresponds to the respective index. If an element of the package consumes a resource, the indexes and corresponding values in the dictionary may be reviewed to determine which element(s) of the package produce that resource.

For example, an element that defines a field is said to be a producer of that field. An element that defines a list, for example, may be a consumer of that field. The element that defines the list is said to be a producer of that list. An element that defines a web template, for example, may be a consumer of that list. The field, the list, and the web template are examples of a resource. These example resources are provided for illustrative purposes and are not intended to be limiting. The example dictionary-based dependency determination techniques described herein are applicable to any suitable type of resource.

An example method is described in which an operation indicator is received that specifies that an operation is to be performed on a first element of a plurality of elements. The plurality of elements is defined by a plurality of respective files that are included in a package. A dictionary is generated that includes a plurality of indexes each of which has one or more values. The plurality of indexes corresponds to a plurality of respective resources. Each value specifies an element of the plurality of elements that produces a resource that corresponds to the respective index. A resource consumption indicator is received that specifies a designated resource of the plurality of resources that the first element consumes. The resource consumption indicator is compared to the plurality of indexes to match the resource consumption indicator to an index of the plurality of indexes that corresponds to the designated resource. A determination is made that the first element depends on a second element that produces the designated resource based on the index that corresponds to the designated resource having a value that specifies that the second element produces the designated resource.

An example import manager is described that includes an operation indicator module, a dictionary generator, a consumption indicator module, a comparison module, and a dependency determination module. The operation indicator module is configured to interpret an operation indicator that specifies that an operation is to be performed on a first element of a plurality of elements. The plurality of elements is defined by a plurality of respective files that are included in a package. The dictionary generator is configured to generate a dictionary that includes a plurality of indexes each of which has one or more values. The plurality of indexes corresponds to a plurality of respective resources. Each value specifies an element of the plurality of elements that produces a resource that corresponds to the respective index. The consumption indicator module is configured to interpret a resource consumption indicator that specifies a designated resource of the plurality of resources that the first element consumes. The comparison module is configured to compare the resource consumption indicator to the plurality of indexes to match the resource consumption indicator to an index of the plurality of indexes that corresponds to the designated resource. The dependency determination module is configured to determine that the first element depends on a second element that produces the designated resource based on the index that corresponds to the designated resource having a value that specifies that the second element produces the designated resource.

An example computer program product is described that includes a computer-readable medium having computer program logic recorded thereon for performing a dictionary-based dependency determination. The computer program product includes first, second, third, fourth, and fifth program logic modules. The first program logic module is for enabling the processor-based system to interpret an operation indicator that specifies that an operation is to be performed on a first element of a plurality of elements. The plurality of elements is defined by a plurality of respective files that are included in a package. The second program logic module is for enabling the processor-based system to generate a dictionary that includes a plurality of indexes each of which has one or more values. The plurality of indexes corresponds to a plurality of respective resources. Each value specifies an element of the plurality of elements that produces a resource that corresponds to the respective index. The third program logic module is for enabling the processor-based system to interpret a resource consumption indicator that specifies a designated resource of the plurality of resources that the first element consumes. The fourth program logic module is for enabling the processor-based system to compare the resource consumption indicator to the plurality of indexes to match the resource consumption indicator to an index of the plurality of indexes that corresponds to the designated resource. The fifth program logic module is for enabling the processor-based system to determine that the first element depends on a second element that produces the designated resource based on the index that corresponds to the designated resource having a value that specifies that the second element produces the designated resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
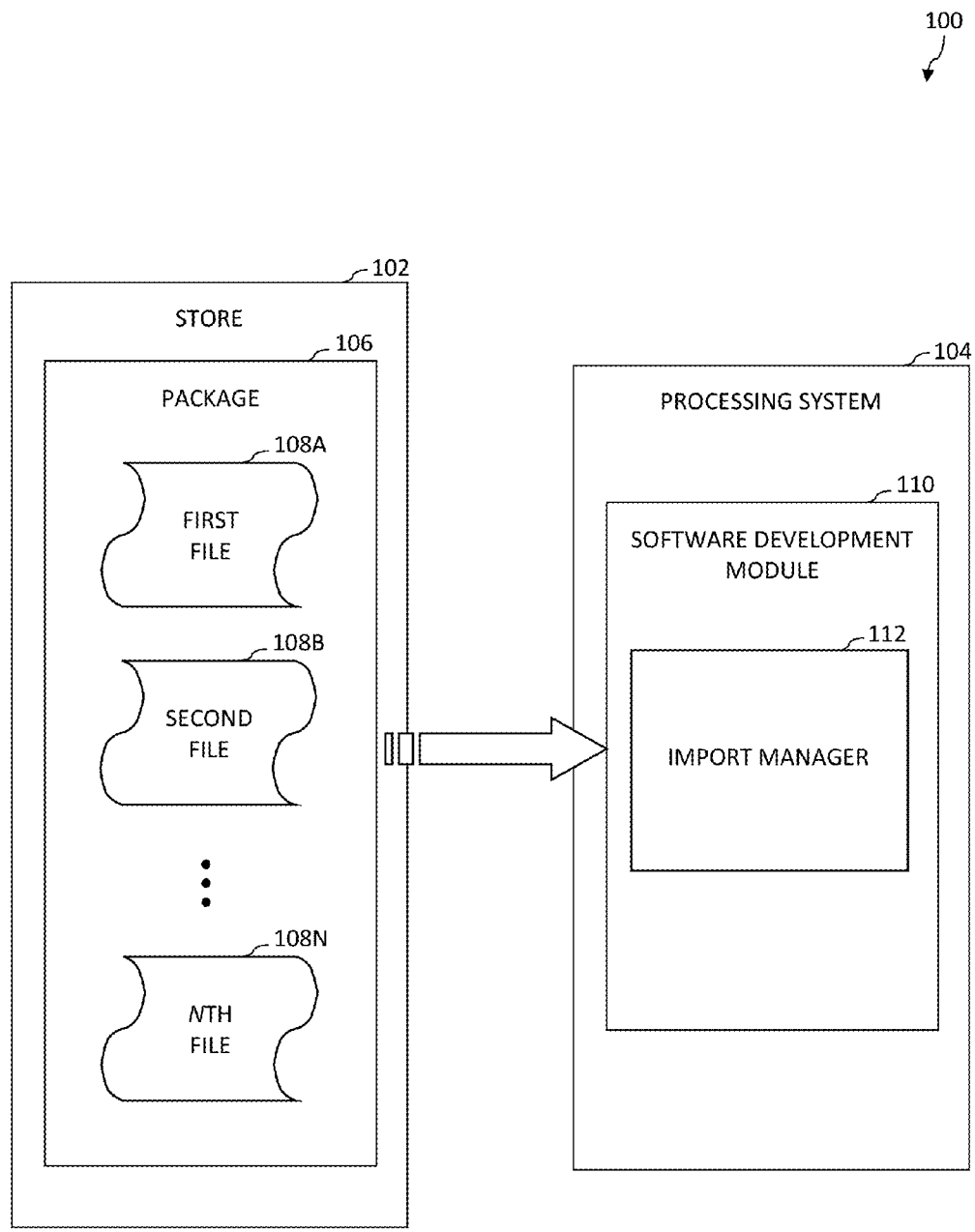
FIG. 1 is a block diagram of an example software development system in accordance with an embodiment.
Figure 4:
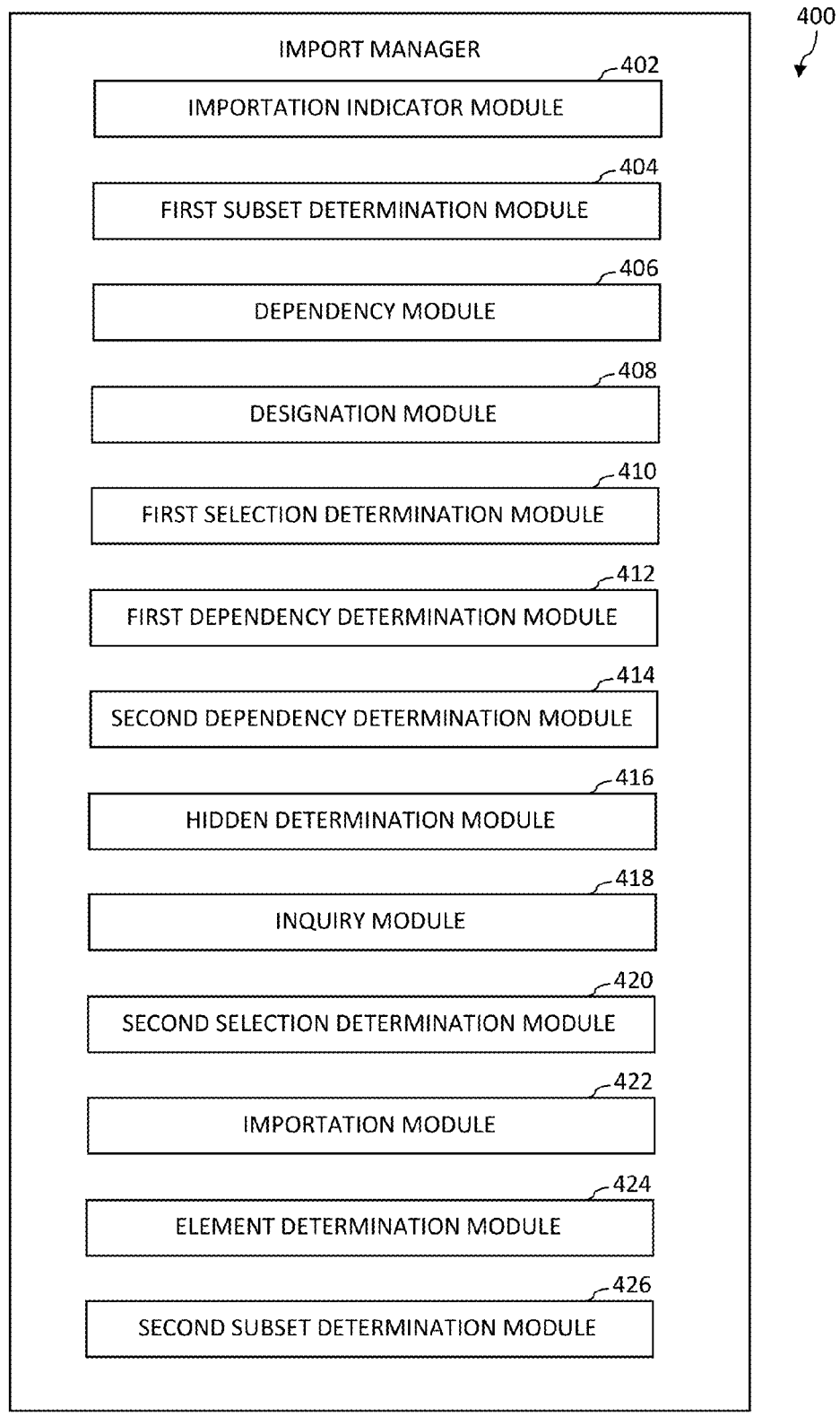
Figure 11:
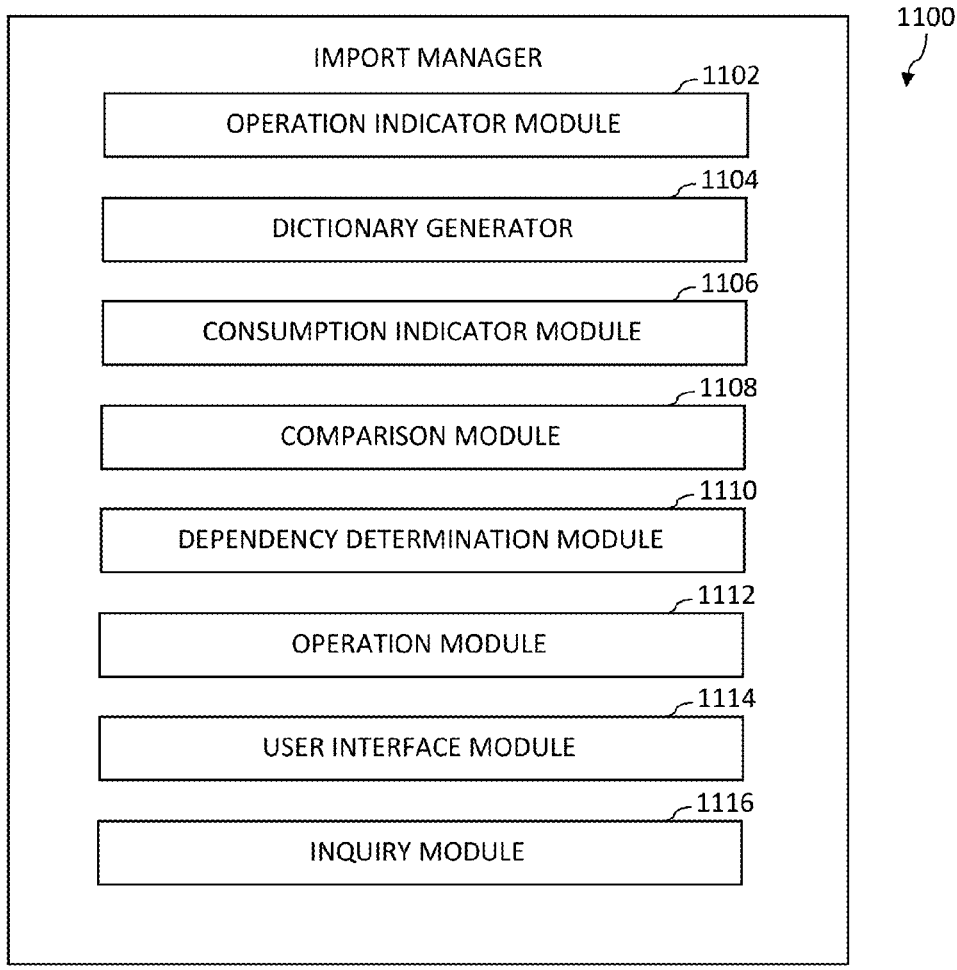
Figure 13:
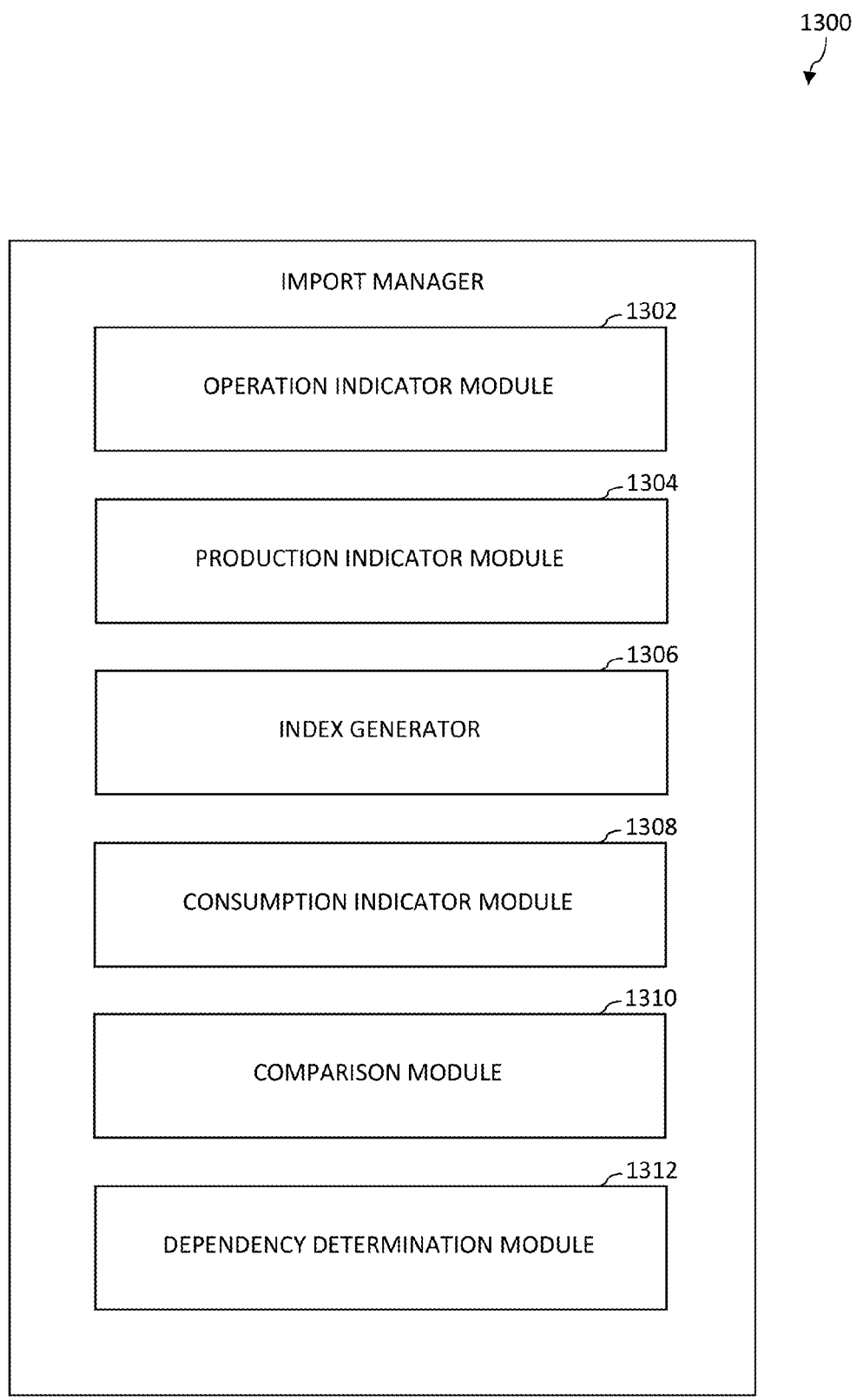

FIGS. 4, 11, and 13 are block diagrams of example implementations of an import manager shown in FIG. 1 in accordance with embodiments.

Figure 5:
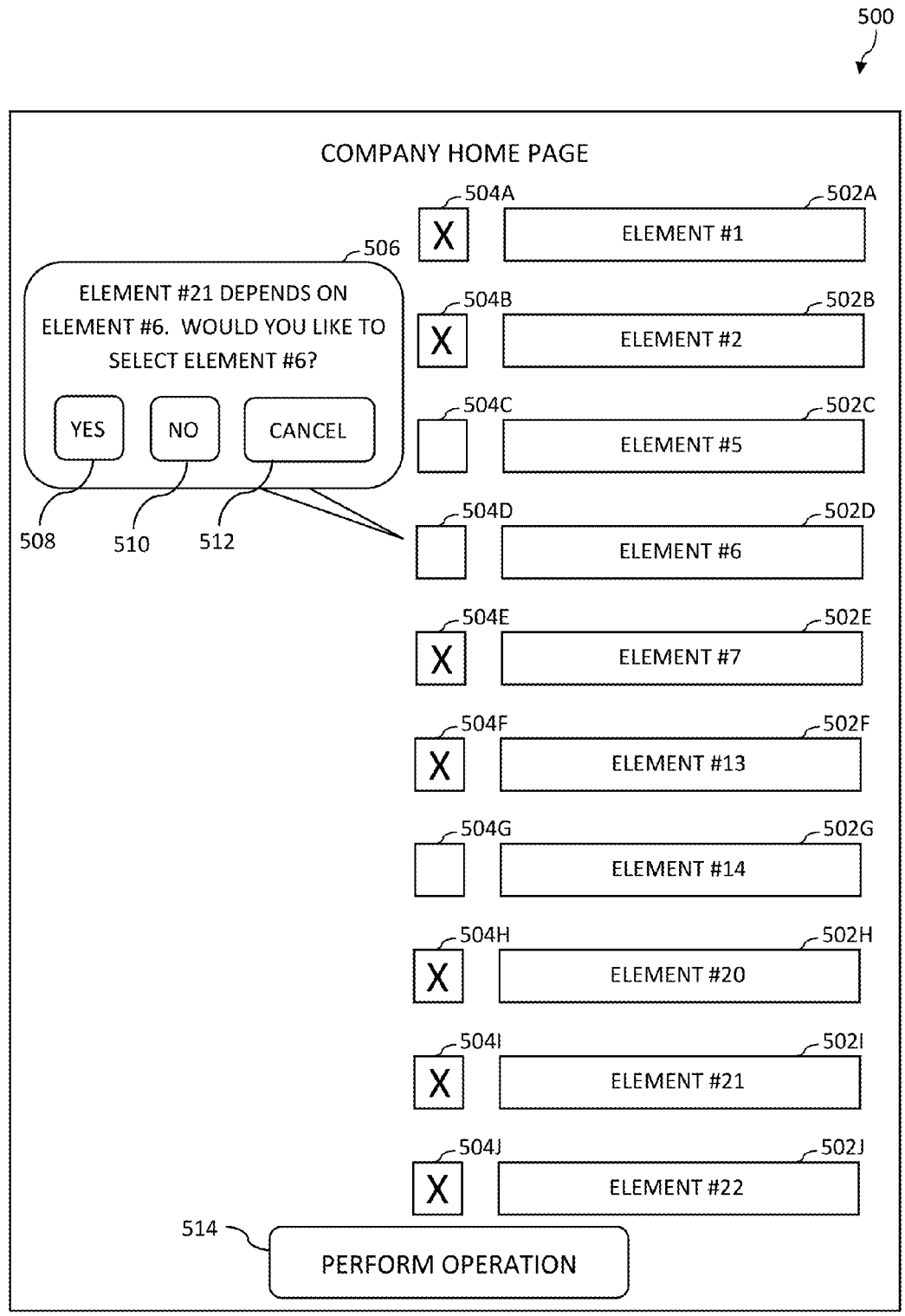

FIG. 5 is an illustration of an example graphical user interface (GUI) in accordance with an embodiment.

FIGS. 6-10 depict flowcharts of methods for performing a dictionary-based dependency determination in accordance with embodiments.

Figure 6:
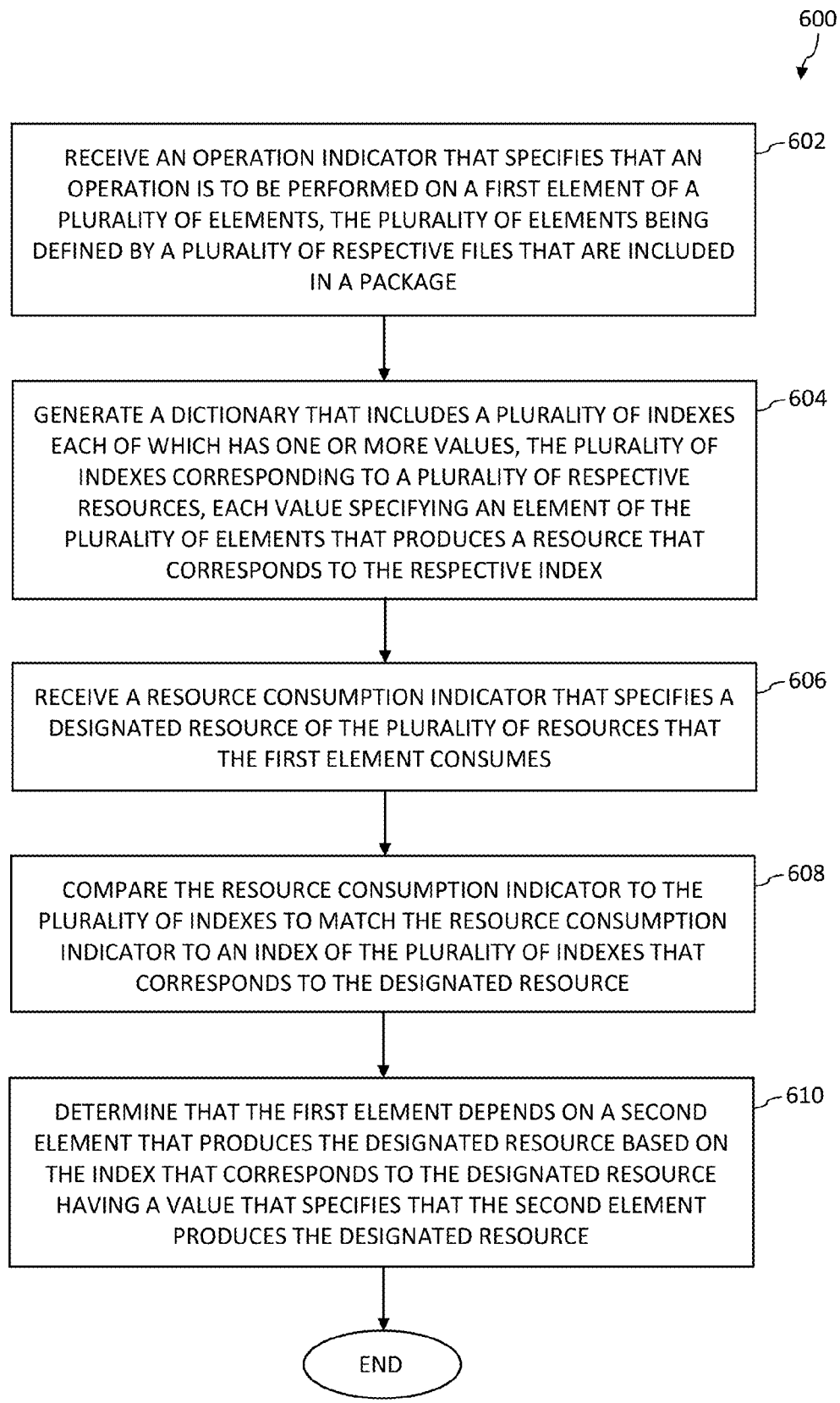
Figure 12:
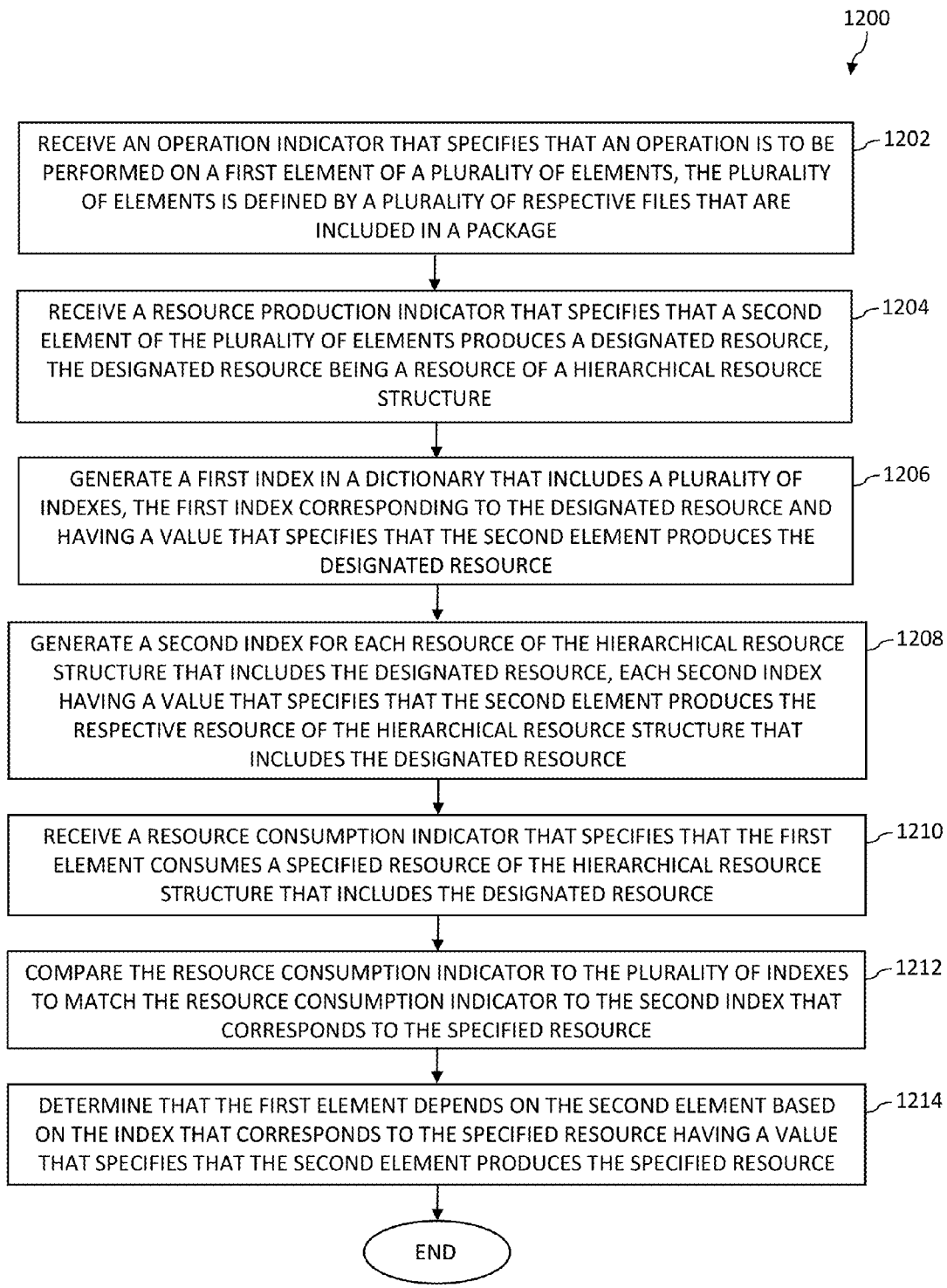

FIG. 12 depicts a flowchart that shows an example way to implement the method of FIG. 6 in accordance with an embodiment.

Figure 14:
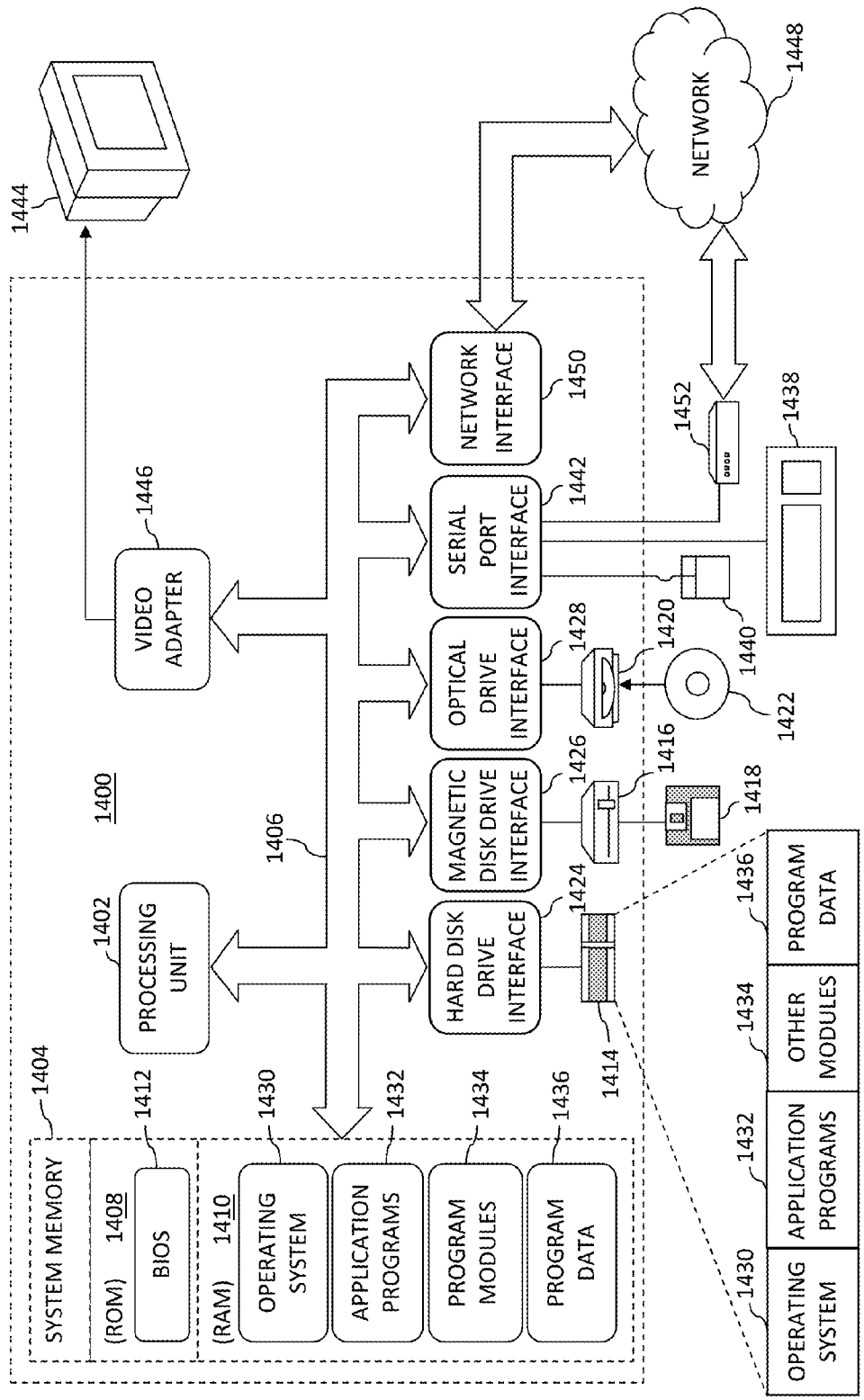

FIG. 14 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Dictionary-Based Dependency Determination Techniques

Example embodiments are capable of performing a dictionary-based dependency determination. For example, when a package is selected to be imported from a store (e.g., a database), a dictionary-based dependency operation may be performed to determine which elements of the package are dependent on other elements of the package. A dictionary includes indexes, each of which has at least one value. The indexes correspond to respective resources (i.e., properties), and each value indicates an element of the package that produces the resource that corresponds to the respective index. If an element of the package consumes a resource, the indexes and corresponding values in the dictionary may be reviewed to determine which element(s) of the package produce that resource. The dictionary may be generated the first time the package is imported and may be reused for subsequent importations of the package, though the scope of the example embodiments is not limited in this respect.

For example, an element that defines a field is said to be a producer of that field. An element that defines a list, for example, may be a consumer of that field. The element that defines the list is said to be a producer of that list. An element that defines a web template, for example, may be a consumer of that list. The field, the list, and the web template are examples of a resource. These example resources are provided for illustrative purposes and are not intended to be limiting. The example dictionary-based dependency determination techniques described herein are applicable to any suitable type of resource.

The example dictionary-based dependency determination techniques described herein have a variety of benefits as compared to conventional dependency determination techniques. For example, the techniques described herein are capable of processing interdependencies between elements. For instance, an operation may be successfully performed on elements of a package even when those elements are dependent on each other. The example techniques are capable of performing many-to-many mapping, meaning that the example techniques are capable of determining dependencies between multiple consumers of a resource and multiple producers of that resource. The example techniques enable users (e.g., software developers) to choose whether operations are performed on elements of a package that is selected for importation. Dependencies between elements need not necessarily be explicitly defined. Furthermore, the example techniques are capable of managing an amount of information that is provided to a user when a dependency determination is performed. For instance, the most useful information may be provided to the user, while less useful information may not be provided to the user.

FIG. 1 is a block diagram of an example software development system 100 in accordance with an embodiment. Generally speaking, software development system 100 operates to import a package from a store (e.g., a database), so that operations may be performed on elements that are defined by markup in the package. The operations is performed on a processing system, such as a server, a desktop computer, a laptop computer, etc. For instance, elements of the package may be changed, and/or an operation may be selectively performed on the elements, to provide a customized solution.

As shown in FIG. 1, software development system 100 includes a store 102 and a processing system 104. Communication between store 102 and processing system 104 is carried out using well-known query languages, such as Structured Query Language (SQL), Java Persistence Query Language (JPQL), etc.

Store 102 is a storage device or system that stores data. Store 102 is shown in FIG. 1 to include a package 106. Package 106 is a collection of files 108A-108N that defines an application or a program. Each of the files 108A-108N includes markup that defines a respective element on which an operation may be performed (e.g., on processing system 104) for implementing the application or program that is defined by the files 108A-108N or for implementing a customized solution that uses the application or program as a template. For instance, the application or program that is defined by the files 108A-108N may be an application for Windows®, a Web-based program, a mobile application (e.g., an application for iPhone®), an application for SharePoint®, etc. Such programs and applications may be written in any suitable programming language (e.g., visual basic, C++, C#, etc.). Store 102 may include processing functionality, though the scope of the example embodiments is not limited in this respect.

Processing system 104 is a system that is capable of retrieving data, such as package 106, from store 102. An example of a processing system is a system that includes at least one processor that is capable of manipulating data in accordance with a set of instructions. For instance, a processing system may be a server, a desktop computer, a laptop computer, or any other suitable type of processing system. Processing system 104 is configured to provide requests to store 102 for requesting data stored on (or otherwise accessible via) store 102. For instance, a user may initiate a request for importing package 106 using a client (e.g., a Web browser, a non-Web-enabled browser, or other type of client) deployed on processing system 104.

Processing system 104 includes a software development module 110. Software development module 110 is configured to execute one or more software development tools. For example, software development module 110 may be configured to create, debug, maintain, and/or otherwise support software applications and/or programs, such as an application or program defined by markup in package 106, in response to instructions received from a user of processing system 104.

Software development module 110 includes an import manager 112. Import manager 112 is a module that is configured to perform a dictionary-based dependency determination with respect to at least some element(s) of a package (e.g., package 106) when the package is selected for importation to processing system 104. In accordance with a first implementation of import manager 112, import manager 112 performs the dictionary-based dependency determination with respect to all element(s) of the package. In accordance with a second implementation of import manager 112, import manager 112 performs the dictionary-based dependency determination with respect to selectable element(s) of the package but not non-selectable element(s) of the package.

A selectable element is an element of a package that is configured to be selectable by a user (e.g., software developer). For example, each element of the package may include a binary flag to indicate whether that element is selectable. In accordance with this example, setting the flag to a first state (e.g., "0") may indicate that the element is not selectable. Setting the flag to a second state (e.g., "1") may indicate that the element is selectable. When an element is selectable, a user may select the element so that an operation is performed on the element on a processing system (e.g., processing system 104), or the user may deselect the element so that the operation is not performed on the element on the processing system. For instance, import manager 112 may provide a user interface for enabling the user to view a visual representation of the package, to select and/or deselect selectable elements of the package, and/or to provide instructions for manipulating markup in the package.

In accordance with an example embodiment, import manager 112 imports selectable elements that are selected and non-selectable elements of the package. For instance, import manager 112 may perform an operation on the selectable elements that are selected and the non-selectable elements on processing system 104. One type of element on which import manager 112 may perform an operation is referred to as a feature. A feature includes operational information (e.g., deployment information) regarding other element(s). For instance, a feature may include information about how, when, and/or where an operation is to be performed on the other element(s). Successful performance of an operation on an element may depend on whether the operation is also performed on a feature that includes operational information regarding that element. Accordingly, it may be desirable to designate the feature as a non-selectable element, so that a user is not allowed to deselect the feature. For instance, designating the feature as a non-selectable element may cause an operation to be automatically performed on the feature when the operation is performed on the element that is referenced by the feature. It will be recognized that features need not necessarily be designated as non-selectable elements.

Another type of element on which import manager 112 may perform an operation is referred to as a property bag. A property bag includes information regarding one or more properties (i.e., resources) that are applicable to other element(s) of the package that includes the property bag. Property bags may be designated as non-selectable elements or as hidden selectable elements, though the scope of the example embodiments is not limited in this respect. A hidden selectable element is an element that is selectable and that is not shown to a user. Accordingly, a hidden selectable element is said to be "hidden" from the user, though it is capable of being selected by the user.

Figure 2:
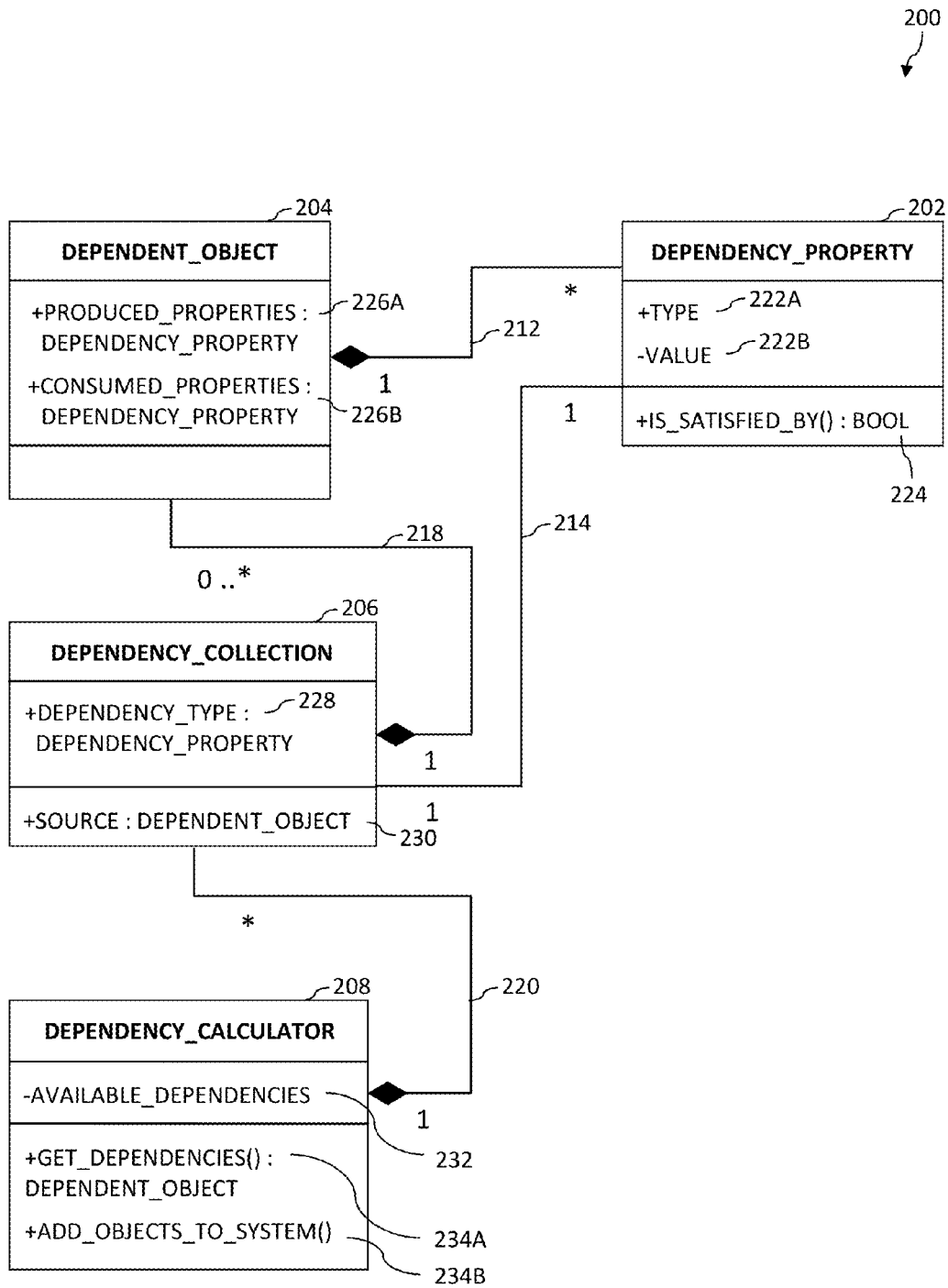
FIG. 2 is a unified modeling language (UML) diagram of an example data model of a store shown in FIG. 1 in accordance with an embodiment.

FIG. 2 is a unified modeling language (UML) diagram 200 of an example data model of a store 102 shown in FIG. 1 in accordance with an embodiment. FIG. 2 is provided in the context of a relational database for illustrative purposes, though the scope of example embodiments is not limited in this respect. For instance, in the discussion of FIG. 2, reference is made to tables for the purpose of clarity and is not intended to be limiting. As shown in FIG. 2, UML diagram 200 includes a dependency property table 202, a dependent object table 204, a dependency collection table 206, and a dependency calculator table 208. UML diagram 200 is described with respect to objects. An object results when an element is deployed on a processing system (e.g., processing system 104). A dependent object is an object that consumes a resource (i.e., a property) that is produced by another object or an object that produces a resource that is consumed by another object. Once an element is deployed as an object, a user may interact with the object, for example, via a user interface.

The numeral "1" and the asterisk "*" that are provided at the ends of some lines in UML diagram 200 indicate a single element and one or more elements (e.g., a plurality of elements), respectively. The range indicator "0 . . . *" indicates any number of elements (e.g., 0, 1, 2, 3, 4, etc.). For example, line 212 indicates that one or more dependency properties may be associated with a dependent object. Line 214 indicates that a dependency property may be associated with a dependency collection. Line 216 indicates that a dependency property may be a hierarchical dependency property. Line 218 indicates that any number of dependent objects may be associated with a dependency collection. Line 220 indicates that one or more dependency collections may be associated with a dependency calculator.

Dependency property table 202 corresponds to a "dependency property" data type. The dependency property data type is a class of objects that defines dependencies. A dependency property may be inherited, meaning that an object that depends on another object that produces or consumes a given dependency property may be deemed to produce or consume that dependency property. Dependency property table 202 includes a list of dependency properties and attributes thereof. Attributes are often referred to as columns in the context of a relational database. A type attribute 222A and a value attribute 222B are shown in dependency property table 202 for illustrative purposes and are not intended to be limiting. For instance, dependency property table 202 need not necessarily include type attribute 222A and/or value attribute 222B. Moreover, dependency property table 202 may include attributes in addition to or in lieu of type attribute 222A and/or value attribute 222B.

Type attribute 222A is a value or object that can be used to uniquely identify a type of dependency, such as a type of dependency property. A dependency property is comparable to another dependency property if their type attributes match. Value attribute 222B is a value or object that can be used to identify a dependency, such as a dependency property. Satisfaction indicator 224 specifies a method whose implementation defines a comparison of values between two dependency properties. In one example embodiment, the method implements a comparison between type and value attributes.

Dependent object table 204 corresponds to a "dependent object" data type. The dependent object data type is a class of objects that produces and consumes dependencies. A dependent object data type may be inherited. Dependent object table 204 includes a list of dependent objects and attributes thereof. A produced properties attribute 226A and a consumed properties attribute 226B are shown in dependent object table 204 for illustrative purposes and are not intended to be limiting.

Produced properties attribute 226A is a collection of dependency properties that are provided by an object and that may be provided to another object's consumed properties collection. A dependency object may produce zero or more properties on which other object(s) may depend. Consumed properties attribute 226B is a collection of dependency properties that may be provided by another dependent object's produced properties collection. A dependency object may consume zero or more properties on which it depends. Accordingly, dependent object "A" is said to be dependent on dependent object "B" if the intersection of the sets of the consumed properties of "A" and the produced properties of "B" is greater than zero.

Each dependent object declares its dependencies. Dependencies of a single dependent object are defined as all dependencies that match on type and value that can be found in a possible solution set of all produced properties that are available. For example, the solution set may be partitioned for efficiency based on the type and value combinations.

A hierarchical dependency may be implemented as a collection of dependencies. For example, a serialization of a path in a tree, such as a URI, may yield multiple dependency objects, one for each node in the tree. In accordance with this example, a producer of a path "http://localhost/serverpath/node.xml" yields dependency properties for each of the following: "http://localhost/", "http://localhost/serverpath/", and "http://localhost/serverpath/node.xml". A consumer of the path "http://localhost/serverpath/" yields one dependency property. These example URIs are provided for illustrative purposes and are not intended to be limiting.

In accordance with some example embodiments, a hierarchical resource structure may be used to describe hierarchical dependencies. A hierarchical resource structure is a hierarchical arrangement of resources that are consumed and/or produced by dependent objects. Each level of the hierarchical resource structure may include any number of resources.

For example, a first resource of a hierarchical resource structure may correspond to a city, a second resource may correspond to a state that includes the city, a third resource may correspond to a country that includes the state, and so on. In accordance with this example, if a first element produces a resource that corresponds to the city of Seattle, the first element is said to also produce a resource that corresponds to the state of Washington and a resource that corresponds to the United States of America. If a second element consumes the resource that corresponds to the United States of America, for example, the second element is said to depend on the first element.

In another example, a hierarchical resource structure may include resources that correspond to respective folders, such that a first folder includes a second folder, which includes a third folder, which includes a fourth folder, and so on. In accordance with this example, if a first element produces a resource at a designated folder of a hierarchical folder structure, the first element is said to produce the resource at each folder of the hierarchical folder structure that includes the designated folder. If a second element consumes the resource at the designated folder or at a folder of the hierarchical folder structure that includes the designated folder, the second element is said to depend on the first element.

The example hierarchical resource structures described above are provided for illustrative purposes and are not intended to be limiting. Any suitable hierarchical resource structure may be used to describe hierarchical dependencies.

Dependency collection table 206 is a partition set of sources for a dependency. A dependency type attribute 228 is a dependency property that specifies a unique set of properties in a system that may be provided by one or more source dependent objects. A source indicator 230 specifies a dependent object that has a value of "dependency type" in its produced properties collection.

Dependency calculator table 208 indicates an instance that collects all dependencies in a possible solution set to calculate dependencies between objects. An available dependencies attribute 232 corresponds to all of the dependencies in the possible solution set. A get dependencies indicator 234A specifies a method that retrieves the dependencies of the dependent objects. An add objects indicator 234B specifies a method that adds designated objects of those that were retrieved by the aforementioned method to the system.

Figure 3A:
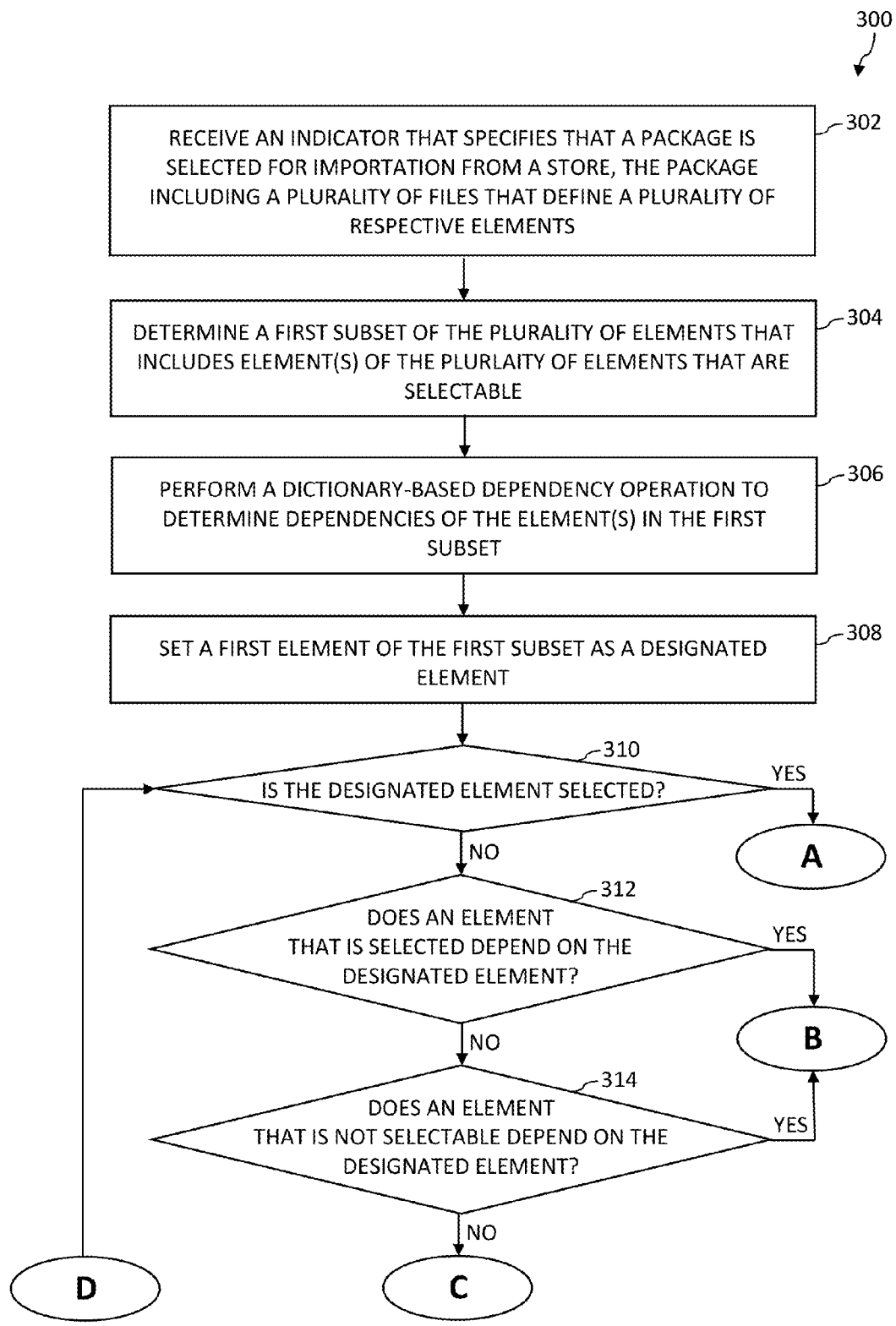
FIGS. 3A and 3B depict respective portions of a flowchart of a method for importing a package using a dictionary-based dependency operation in accordance with an embodiment.
Figure 3B:
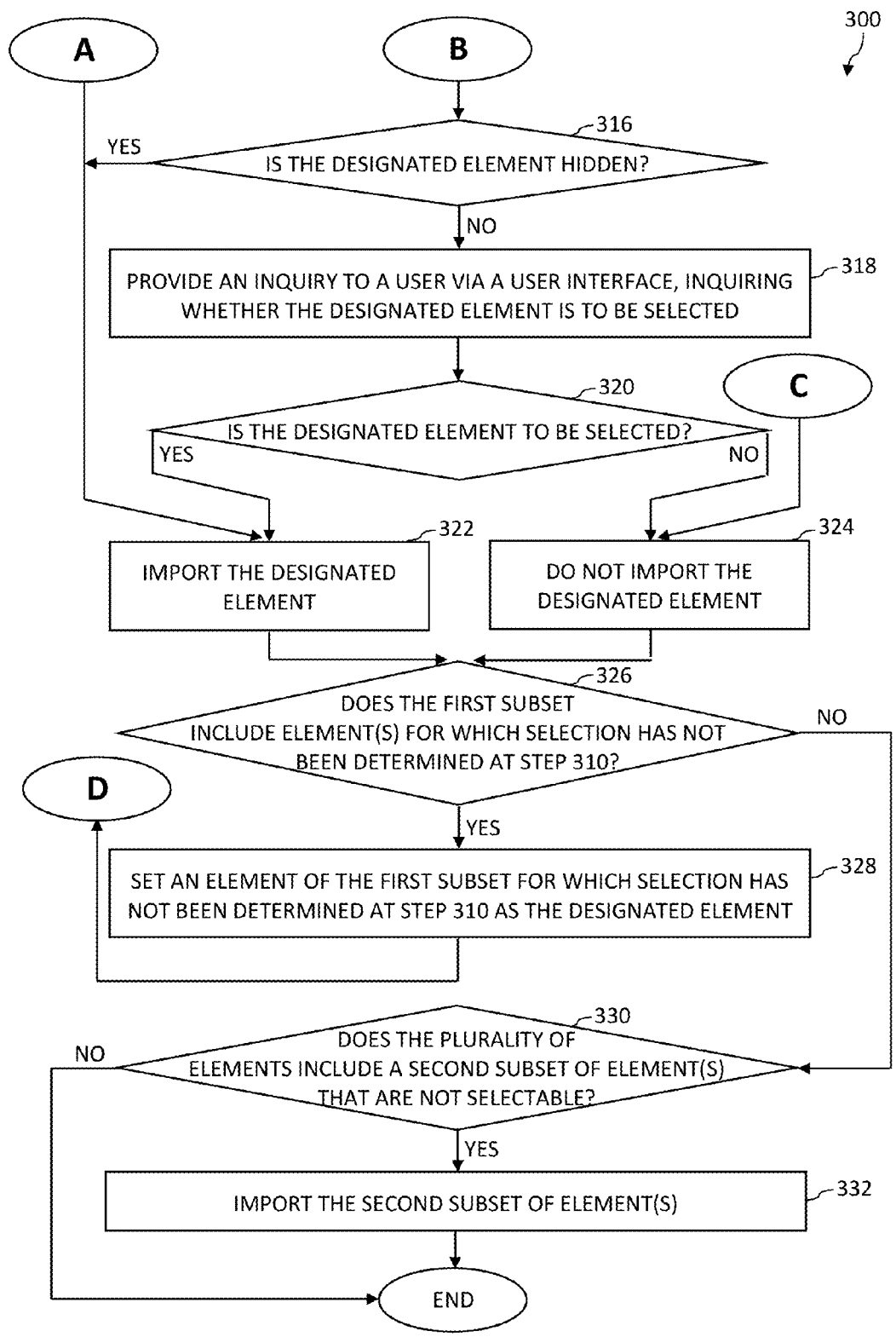

FIGS. 3A and 3B depict respective portions of a flowchart 300 of a method for importing a package using a dictionary-based dependency operation in accordance with an embodiment. Flowchart 300 may be performed by import manager 112 of software development system 100 shown in FIG. 1, for example. For illustrative purposes, flowchart 300 is described with respect to an import manager 400 shown in FIG. 4, which is an example of import manager 112, according to an embodiment. As shown in FIG. 4, import manager 400 includes an importation indicator module 402, a first subset determination module 404, a dependency module 406, a designation module 408, a first selection determination module 410, a first dependency determination module 412, a second dependency determination module 414, a hidden determination module 416, an inquiry module 418, a second selection determination module 420, an importation module 422, an element determination module 424, and a second subset determination module 426. Further structural and operational embodiments will be apparent to persons skilled in the relevant art(s) based on the discussion regarding flowchart 300. Flowchart 300 is described as follows.

As shown in FIG. 3A, the method of flowchart 300 begins at step 302. In step 302, an indicator is received that specifies that a package is selected for importation from a store. The package includes a plurality of files that define a plurality of respective elements. In an example implementation, importation indicator module 402 receives the indicator that specifies that the package is selected for importation. For instance, importation indicator module 402 may be configured to interpret the indicator to determine that the package is selected for importation.

At step 304, a first subset of the plurality of elements that includes element(s) of the plurality of elements that are selectable is determined. In an example implementation, first subset determination module 404 determines the first subset.

At step 306, a dictionary-based dependency operation is performed to determine dependencies of the element(s) in the first subset. In an example implementation, dependency module 406 performs the dictionary-based dependency operation.

At step 308, a first element of the first subset is set as a designated element. In an example implementation, designation module 408 sets a first element of the first subset as the designated element.

At step 310, a determination is made whether the designated element is selected. In an example implementation, first selection determination module 410 determines whether the designated element is selected. If the designated element is selected, flow continues to step 322, which is shown in FIG. 3B. Otherwise, flow continues to step 312.

At step 312, a determination is made whether an element that is selected depends on the designated element. In an example implementation, first dependency determination module determines whether an element that is selected depends on the designated element. If an element that is selected depends on the designated element, flow continues to step 316, which is shown in FIG. 3B. Otherwise, flow continues to step 314.

At step 314, a determination is made whether an element that is not selectable depends on the designated element. In an example implementation, second dependency determination module 414 determines whether an element that is not selectable depends on the designated element. If an element that is not selectable depends on the designated element, flow continues to step 316, which is shown in FIG. 3B. Otherwise, flow continues to step 324, which is shown in FIG. 3B.

At step 316, a determination is made whether the designated element is hidden. In an example implementation, hidden determination module 416 determines whether the designated element is hidden. If the designated element is hidden, flow continues to step 322. Otherwise, flow continues to step 318.

At step 318, an inquiry is provided to a user via a user interface, inquiring whether the designated element is to be selected. In an example implementation, inquiry module 418 provides the inquiry to the user.

At step 320, a determination is made whether the designated element is to be selected. In an example implementation, second selection determination module 420 determines whether the designated element is to be selected. If the designated element is to be selected, flow continues to step 322. Otherwise, flow continues to step 324.

At step 322, the designated element is imported. In an example implementation, importation module 422 imports the designated element.

At step 324, the designated element is not imported. In an example implementation, importation module 422 does not import the designated element.

At step 326, a determination is made whether the first subset includes element(s) for which selection has not been determined at step 310. In an example implementation, element determination module 424 determines whether the first subset includes element(s) for which selection has not been determined at step 310. If the first subset includes element(s) for which selection has not been determined at step 310, flow continues to step 328. Otherwise, flow continues to step 330.

At step 328, an element of the first subset for which selection has not been determined at step 310 is set as the designated element. In an example implementation, designation module 408 sets an element of the first subset for which selection has not been determined at step 310 as the designated element. Upon completion of step 328, flow continues to step 310, which is shown in FIG. 3A.

At step 330, a determination is made whether the plurality of elements includes a second subset of element(s) that are not selectable. In an example implementation, second subset determination module 426 determines whether the plurality of elements includes a second subset of element(s) that are not selectable. If the plurality of elements includes a second subset of element(s) that are not selectable, flow continues to step 332. Otherwise, flowchart 300 ends.

At step 332, the second subset of element(s) is imported. In an example implementation, importation module 422 imports the second subset of element(s). Upon completion of step 332, flowchart 300 ends.

In some example embodiments, one or more steps 302, 304, 306, 308, 310, 312, 314, 316, 318, 320, 322, 324, 326, 328, 330, and/or 332 of flowchart 300 may not be performed. Moreover, steps in addition to or in lieu of steps 302, 304, 306, 308, 310, 312, 314, 316, 318, 320, 322, 324, 326, 328, 330, and/or 332 may be performed.

It will be recognized that import manager 400 may not include one or more of importation indicator module 402, first subset determination module 404, dependency module 406, designation module 408, first selection determination module 410, first dependency determination module 412, second dependency determination module 414, hidden determination module 416, inquiry module 418, second selection determination module 420, importation module 422, element determination module 424, and/or second subset determination module 426. Furthermore, import manager 400 may include modules in addition to or in lieu of importation indicator module 402, first subset determination module 404, dependency module 406, designation module 408, first selection determination module 410, first dependency determination module 412, second dependency determination module 414, hidden determination module 416, inquiry module 418, second selection determination module 420, importation module 422, element determination module 424, and/or second subset determination module 426.

FIG. 5 is an illustration of an example graphical user interface (GUI) 500 in accordance with an embodiment. GUI 500 includes a visual representation of a package that defines a company home page for illustrative purposes and is not intended to be limiting. GUI 500 may include a visual representation of any suitable type of package. For instance, the visual representation of the package that defines the company home page may be provided via the GUI 500 in response to a user selecting the package for importation from a store (e.g., store 102).

GUI 500 includes visual representations of elements 502A-502J that are defined by files in the package. Selection indicators 504A-504J indicate that elements 502A-502J are selectable by a user. Elements 502A-502J are shown to be elements #1, 2, 5-7, 13, 14, and 20-22, respectively. It should be noted that elements #3, 4, 8-12, and 15-19 are not listed in GUI 500 for illustrative purposes. For example, each of elements #3, 4, 8-12, and 15-19 may be a non-selectable element or a hidden selectable element.

In FIG. 5, elements 504A, 504B, 504E, 504F, and 504H-504J are shown to be selected for illustrative purposes. Elements 504C, 504D, and 504G are shown to be not selected. A user may deselect any of the selected elements and/or select any of the unselected elements by clicking on the respective selection indicators 504A-504J. For example, the user may deselect element 502A by clicking on selection element 504A. In another example, the user may select element 502D by clicking on selection element 504D. In the discussion above, the selection and de-selection of selection indicators 504A-504J is described in terms of a user clicking on the selection indicators 504A-504J for illustrative purposes and is not intended to be limiting. It will be recognized that the user may select or deselect selection indicators 504A-504J using any suitable technique. For example, the user may touch a portion of a touch screen that corresponds to a selection indicator to select or deselect that selection indicator; the user may provide a voice command; etc.

When a user selects a package for importation from a store, a dictionary-based dependency operation is performed with respect to selectable elements that are included in the package. Performance of the dictionary-based dependency operation may be limited to those selectable elements that are selected and potentially selectable elements upon which those selected elements depend, though the scope of the example embodiments is not limited in this respect. For instance, the dictionary-based dependency operation alternatively may be performed with respect to all selectable elements, regardless whether those elements are selected.

Inquiry 506 is provided in GUI 500 in response to a dictionary-based dependency operation determining that element 502I (i.e., element #21) depends on element 502D (i.e., element #6). Inquiry 506 inquires whether the user would like to select element 502D, so that an operation may be performed on element 502D along with element 502I. The user may click "yes" button 508 to select element 502D. The user may click "no" button 510 to not select element 502D. The user may select "cancel" button 512 to remove inquiry 506 from GUI 500. Once the user clicks button 508, 510, or 512, the user may select any one or more of the unselected elements and/or deselect any one or more of the selected elements.

Once the user has selected any unselected elements on which the user wants an operation to be performed and/or deselected any selected elements on which the user does not want the operation to be performed, the user may click "perform operation" button 514 to cause the operation to be performed on the selected elements.

FIGS. 6-10 depict flowcharts of methods for performing a dictionary-based dependency determination in accordance with embodiments. Flowcharts 600, 700, 800, 900, and 1000 may be performed by import manager 112 of software development system 100 shown in FIG. 1, for example. For illustrative purposes, flowcharts 600, 700, 800, 900, and 1000 are described with respect to an import manager 1100 shown in FIG. 11, which is an example of import manager 112, according to an embodiment. As shown in FIG. 11, import manager 1100 includes an operation indicator module 1102, a dictionary generator 1104, a consumption indicator module 1106, a comparison module 1108, a dependency determination module 1110, an operation module 1112, a user interface module 1114, and an inquiry module 1116. Further structural and operational embodiments will be apparent to persons skilled in the relevant art(s) based on the discussion regarding flowcharts 600, 700, 800, 900, and 1000.

As shown in FIG. 6, the method of flowchart 600 begins at step 602. In step 602, an operation indicator is received that specifies that an operation is to be performed on a first element of a plurality of elements. The plurality of elements is defined by a plurality of respective files that are included in a package. In an example implementation, operation indicator module 1102 receives the operation indicator. For instance, operation indicator module 1102 may interpret the operation indicator to determine that the operation is to be performed on the first element of the plurality of elements.

At step 604, a dictionary is generated that includes a plurality of indexes each of which has one or more values. The plurality of indexes corresponds to a plurality of respective resources. Each value specifies an element of the plurality of elements that produces a resource that corresponds to the respective index. In an example implementation, dictionary generator generates the dictionary.

At step 606, a resource consumption indicator is received that specifies a designated resource of the plurality of resources that the first element consumes. In an example implementation, consumption indicator module 1106 receives the resource consumption indicator. For instance, consumption indicator module 1106 may interpret the resource consumption indicator to determine that the first element consumes the designated resource.

At step 608, the resource consumption indicator is compared to the plurality of indexes to match the resource consumption indicator to an index of the plurality of indexes that corresponds to the designated resource. For example, the resource consumption indicator may be compared to the plurality of indexes using a hash-table (e.g., a flat hash-table) or any other suitable technique. In an example implementation, comparison module 1108 compares the resource consumption indicator to the plurality of indexes to match the resource consumption indicator to an index that corresponds to the designated resource.

At step 610, a determination is made that the first element depends on a second element that produces the designated resource based on the index that corresponds to the designated resource having a value that specifies that the second element produces the designated resource. In an example implementation, dependency determination module 1110 determines that the first element depends on the second element.

In accordance with an example embodiment, the determination that is made at step 610 may be further based on the first element having a deployment location that corresponds to a deployment location of the second element. A deployment location is a location (e.g., a folder) at which an element is to be deployed. A deployment location of a consumer element corresponds to a deployment location of a producer element if the deployment location of the producer element is the same as or is a subfolder of the deployment location of the consumer element. For instance, the deployment location of the first element may be specified as "http://www.microsoft.com", and the deployment location of the second element, which corresponds to the deployment location of the first element, may be specified as "http://www.microsoft.com" or a subfolder thereof (e.g., "http://www.microsoft.com/servergroup/", "http://www.microsoft.com/studio/web/", etc.).

It will be recognized that the steps of flowchart 600 may be performed for each element of the plurality of elements on which the operation is to be performed. Moreover, steps 606, 608, and 610 of flowchart 600 may be performed for each resource of the plurality of resources that a given element consumes.

Figure 7:
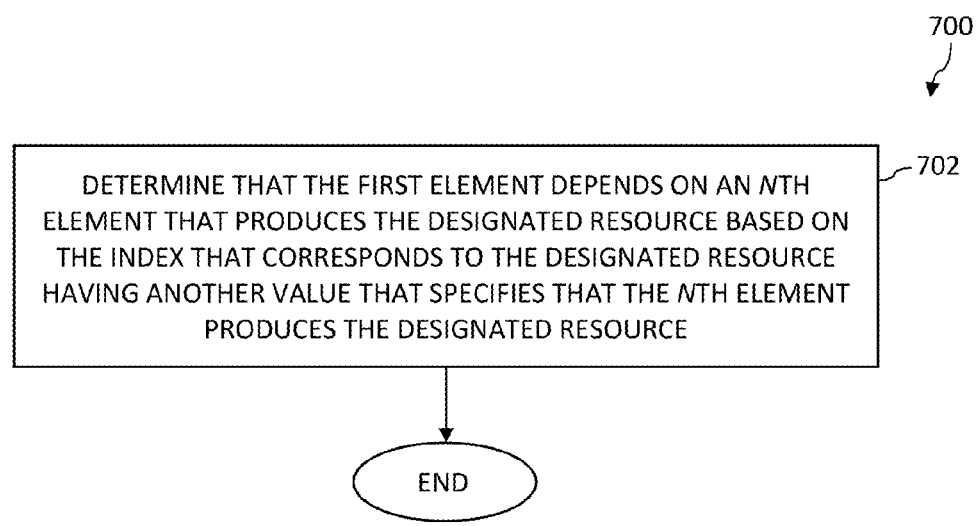
Figure 8:
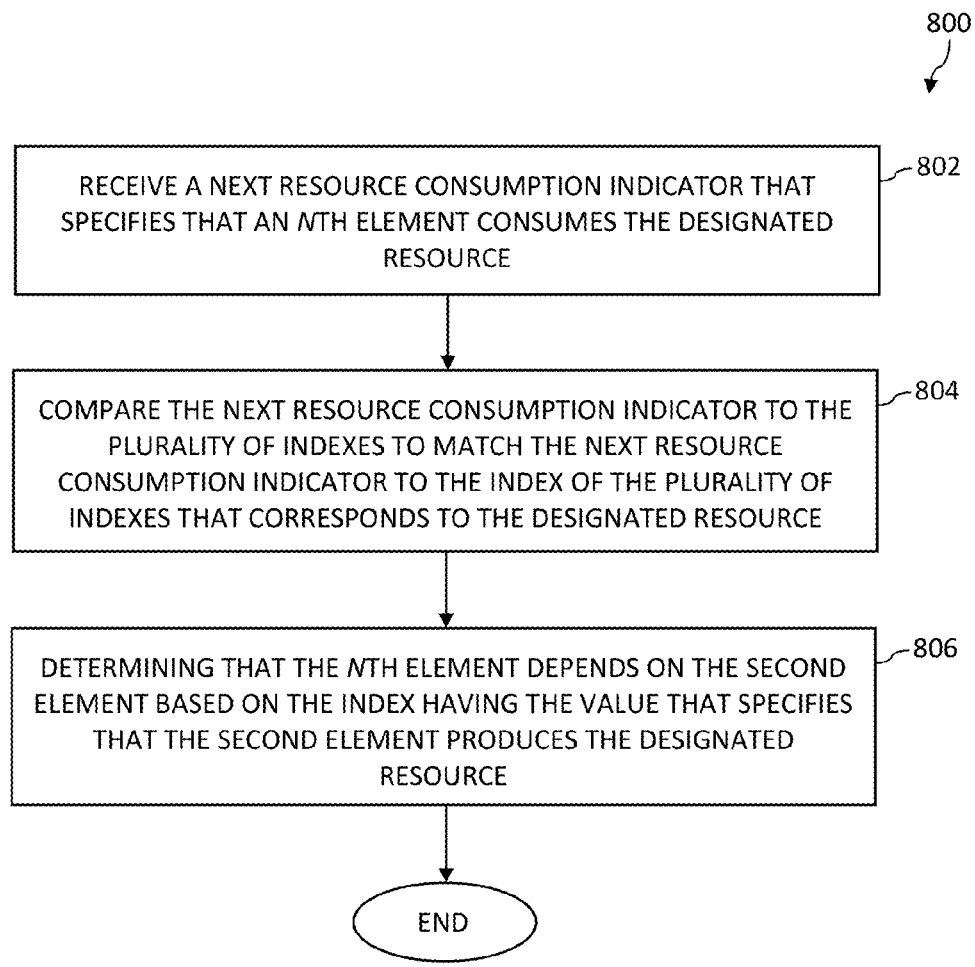
Figure 9:
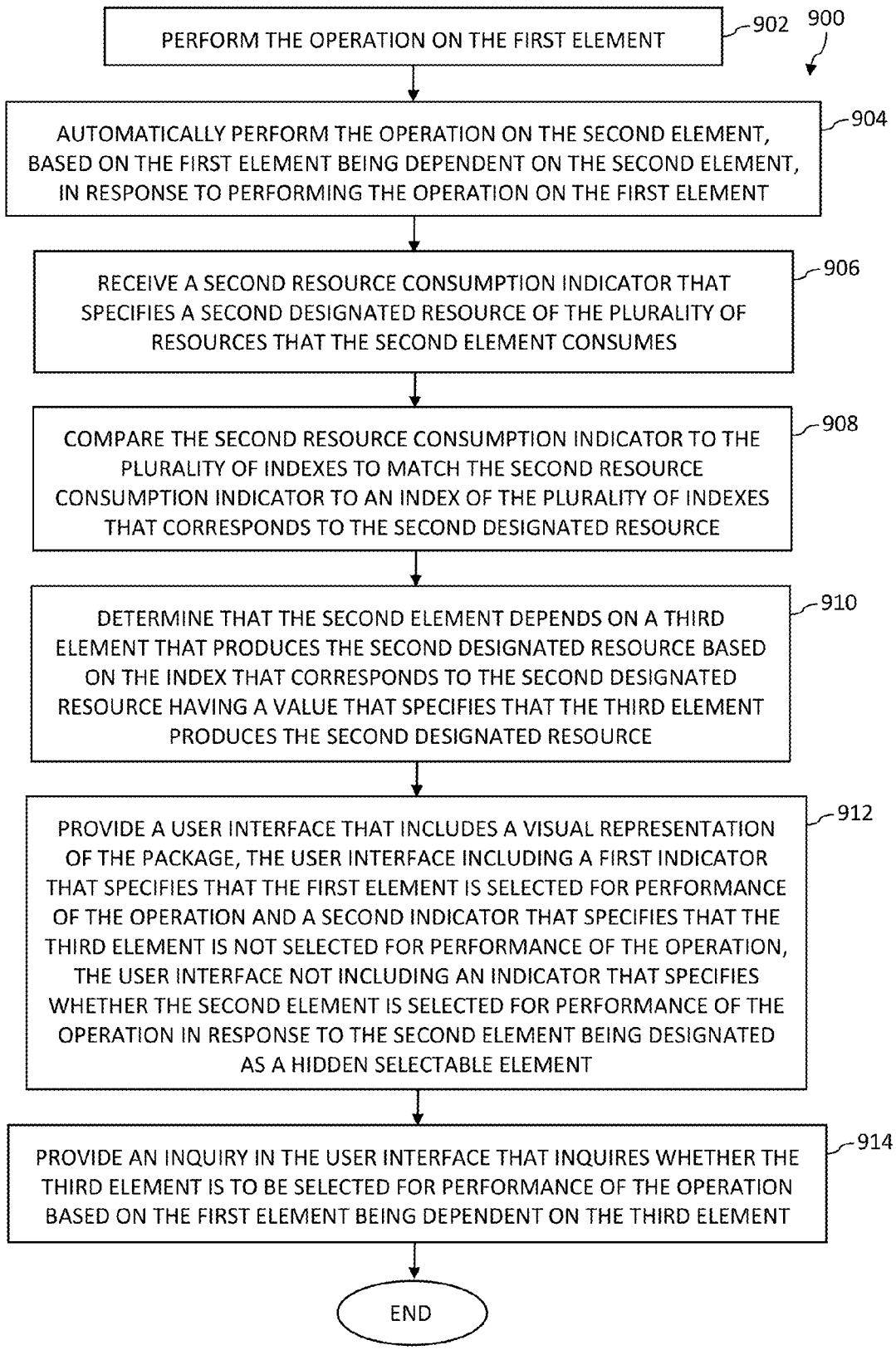

In accordance with example embodiments, instead of flowchart 600 ending upon completion of step 610, flow may continue with step 702 in flowchart 700 of FIG. 7; steps 802, 804, and 806 in flowchart 800 of FIG. 8; or steps 902, 904, 906, 908, 910, 912, and 914 in flowchart 900 of FIG. 9. As shown in FIG. 7, the method of flowchart 700 begins at step 702. In step 702, a determination is made that the first element depends on an Nth element that produces the designated resource based on the index that corresponds to the designated resource having another value that specifies that the Nth element produces the designated resource. N is an integer. In an example implementation, dependency determination module 1110 determines that the first element depends on the Nth element.

As shown in FIG. 8, the method of flowchart 800 begins at step 802. In step 802, a next resource consumption indicator is received that specifies that an Nth element consumes the designated resource. N is an integer. In an example implementation, consumption indicator module 1106 receives the next resource consumption indicator. For instance, consumption indicator module 1106 may interpret the next resource consumption indicator to determine that the Nth element consumes the designated resource.

At step 804, the next resource consumption indicator is compared to the plurality of indexes to match the next resource consumption indicator to the index of the plurality of indexes that corresponds to the designated resource. In an example implementation, comparison module 1108 compares the next resource consumption indicator to the plurality of indexes to match the next resource consumption indicator to the index of the plurality of indexes that corresponds to the designated resource.

At step 806, a determination is made that the Nth element depends on the second element based on the index having the value that specifies that the second element produces the designated resource. In an example implementation, dependency determination module 1110 determines that the Nth element depends on the second element.

As shown in FIG. 9, the method of flowchart 900 begins at step 902. In step 902, the operation is performed on the first element. In an example implementation, operation module 1112 performs the operation on the first element.

At step 904, the operation is automatically performed on the second element, based on the first element being dependent on the second element, in response to performing the operation on the first element. In an example implementation, operation module 1112 automatically performs the operation on the second element.

At step 906, a second resource consumption indicator is received that specifies a second designated resource of the plurality of resources that the second element consumes. In an example implementation, consumption indicator module 1106 receives the second resource consumption indicator. For instance, consumption indicator module 1106 may interpret the second resource consumption indicator to determine that the second element consumes the second designated resource.

At step 908, the second resource consumption indicator is compared to the plurality of indexes to match the second resource consumption indicator to an index of the plurality of indexes that corresponds to the second designated resource. In an example implementation, comparison module 1108 compares the second resource consumption indicator to the plurality of indexes to match the second resource consumption indicator to an index of the plurality of indexes that corresponds to the second designated resource.

At step 910, a determination is made that the second element depends on a third element that produces the second designated resource based on the index that corresponds to the second designated resource having a value that specifies that the third element produces the second designated resource. In an example implementation, dependency determination module 1110 determines that the second element depends on the third element.

At step 912, a user interface is provided that includes a visual representation of the package. The user interface includes a first indicator that specifies that the first element is selected for performance of the operation and a second indicator that specifies that the third element is not selected for performance of the operation. The user interface does not include an indicator that specifies whether the second element is selected for performance of the operation in response to the second element being designated as a hidden selectable element. In an example implementation, user interface module provides the user interface.

At step 914, an inquiry is provided in the user interface that inquires whether the third element is to be selected for performance of the operation based on the first element being dependent on the third element. In an example implementation, inquiry module 1116 provides the inquiry in the user interface.

Figure 10:
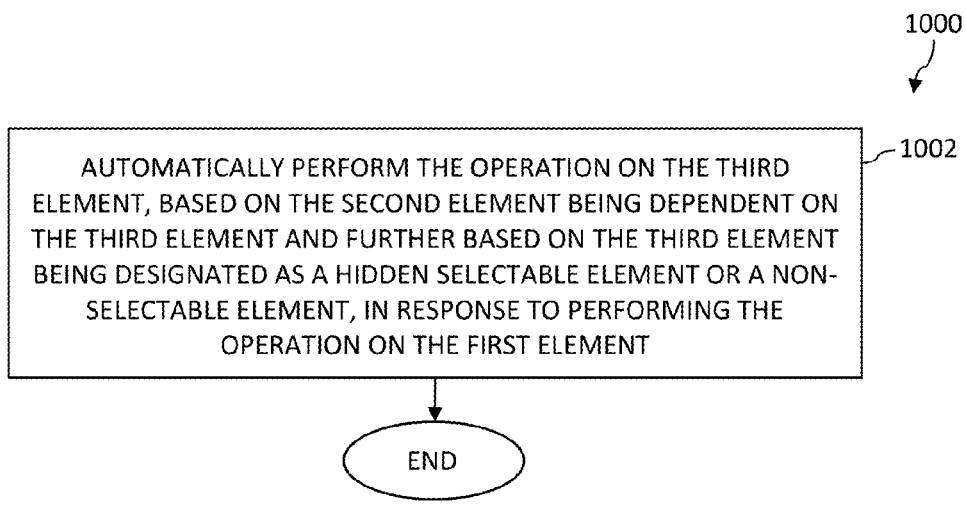

In accordance with an embodiment, steps 912 and 914 of flowchart 900 may be replaced with the step shown in flowchart 1000 of FIG. 10. As shown in FIG. 10, the method of flowchart 1000 begins at step 1002. In step 1002, the operation is automatically performed on the third element, based on the second element being dependent on the third element and further based on the third element being designated as a hidden selectable element or a non-selectable element, in response to performing the operation on the first element. In an example implementation, operation module 1112 automatically performs the operation on the third element.

Flowcharts 900 and 1000 are described with respect to three elements for illustrative purposes and are not intended to be limiting. Persons skilled in the relevant art(s) will recognize that the methods of flowcharts 900 and 1000 may be performed with respect to any number of elements.

FIG. 12 depicts a flowchart 1200 that shows an example way to implement the method of FIG. 6 in accordance with an embodiment. Flowchart 1200 may be performed by import manager 112 of software development system 100 shown in FIG. 1, for example. For illustrative purposes, flowchart 1200 is described with respect to an import manager 1300 shown in FIG. 11, which is an example of import manager 112, according to an embodiment. As shown in FIG. 13, import manager 1300 includes an operation indicator module 1302, a production indicator module 1304, an index generator 1306, a consumption indicator module 1308, a comparison module 1310, and a dependency determination module 1312. Further structural and operational embodiments will be apparent to persons skilled in the relevant art(s) based on the discussion regarding flowchart 1200.

As shown in FIG. 12, the method of flowchart 1200 begins at step 1202. In step 1202, an operation indicator is received that specifies that an operation is to be performed on a first element of a plurality of elements. The plurality of elements is defined by a plurality of respective files that are included in a package. In an example implementation, operation indicator module 1302 receives the operation indicator. For instance operation indicator module 1302 may interpret the operation indicator to determine that the operation is to be performed on the first element of the plurality of elements.

At step 1204, a resource production indicator is received that specifies that a second element of the plurality of elements produces a designated resource, the designated resource being a resource of a hierarchical resource structure. In an example implementation, production indicator module 1304 receives the resource production indicator. For instance, production indicator module 1304 may interpret the resource production indicator to determine that the second element of the plurality of elements produces the designated resource.

At step 1206, a first index is generated in a dictionary that includes a plurality of indexes. The first index corresponds to the designated resource and has a value that specifies that the second element produces the designated resource. In an example implementation, index generator 1306 generates the first index.

At step 1208, a second index is generated for each resource of the hierarchical resource structure that includes the designated resource. Each second index has a value that specifies that the second element produces the respective resource of the hierarchical resource structure that includes the designated resource. In an example implementation, index generator 1306 generates the second index for each resource of the hierarchical resource structure that includes the designated resource.

At step 1210, a resource consumption indicator is received that specifies that the first element consumes a specified resource of the hierarchical resource structure that includes the designated resource. In an example implementation, consumption indicator module 1308 receives the resource consumption indicator. For instance, consumption indicator module 1308 may interpret the resource consumption indicator to determine that the first element consumes the specified resource.

At step 1212, the resource consumption indicator is compared to the plurality of indexes to match the resource consumption indicator to the second index that corresponds to the specified resource. In an example implementation, comparison module 1310 compares the resource consumption indicator to the plurality of indexes to match the resource consumption indicator to the second index that corresponds to the specified resource.

At step 1214, a determination is made that the first element depends on the second element based on the index that corresponds to the specified resource having a value that specifies that the second element produces the specified resource. In an example implementation, dependency determination module 1312 determines that the first element depends on the second element.

Flowchart 1200 is described with respect to a first element and a second element for illustrative purposes and is not intended to be limiting. Persons skilled in the relevant art(s) will recognize that the steps of flowchart 1200 may be performed any number of times to determine that one or more elements depend on one or more other elements. For instance, elements may depend on each other.

It will be recognized that software development module 110, import manager 112, importation indicator module 402, first subset determination module 404, dependency module 406, designation module 408, first selection determination module 410, first dependency determination module 412, second dependency determination module 414, hidden determination module 416, inquiry module 418, second selection determination module 420, importation module 422, element determination module 424, and second subset determination module 426 depicted in FIG. 4; operation indicator module 1102, dictionary generator 1104, consumption indicator module 1106, comparison module 1108, dependency determination module 1110, operation module 1112, user interface module 1114, and inquiry module 1116 depicted in FIG. 11; and operation indicator module 1302, production indicator module 1304, index generator 1306, consumption indicator module 1308, comparison module 1310, and dependency determination module 1312 depicted in FIG. 13 may be implemented in hardware, software, firmware, or any combination thereof.

For example, software development module 110, import manager 112, importation indicator module 402, first subset determination module 404, dependency module 406, designation module 408, first selection determination module 410, first dependency determination module 412, second dependency determination module 414, hidden determination module 416, inquiry module 418, second selection determination module 420, importation module 422, element determination module 424, second subset determination module 426, operation indicator module 1102, dictionary generator 1104, consumption indicator module 1106, comparison module 1108, dependency determination module 1110, operation module 1112, user interface module 1114, inquiry module 1116, operation indicator module 1302, production indicator module 1304, index generator 1306, consumption indicator module 1308, comparison module 1310, and/or dependency determination module 1312 may be implemented as computer program code configured to be executed in one or more processors.

In another example, software development module 110, import manager 112, importation indicator module 402, first subset determination module 404, dependency module 406, designation module 408, first selection determination module 410, first dependency determination module 412, second dependency determination module 414, hidden determination module 416, inquiry module 418, second selection determination module 420, importation module 422, element determination module 424, second subset determination module 426, operation indicator module 1102, dictionary generator 1104, consumption indicator module 1106, comparison module 1108, dependency determination module 1110, operation module 1112, user interface module 1114, inquiry module 1116, operation indicator module 1302, production indicator module 1304, index generator 1306, consumption indicator module 1308, comparison module 1310, and/or dependency determination module 1312 may be implemented as hardware logic/electrical circuitry.

FIG. 14 depicts an example computer 1400 in which embodiments may be implemented. Processing system 104 shown in FIG. 1 (or any one or more subcomponents thereof shown in FIGS. 1, 4, 11, and 13) may be implemented using computer 1400, including one or more features of computer 1400 and/or alternative features. Computer 1400 may be a general-purpose computing device in the form of a conventional personal computer, a mobile computer, or a workstation, for example, or computer 1400 may be a special purpose computing device. The description of computer 1400 provided herein is provided for purposes of illustration, and is not intended to be limiting. Embodiments may be implemented in further types of computer systems, as would be known to persons skilled in the relevant art(s).

As shown in FIG. 14, computer 1400 includes a processing unit 1402, a system memory 1404, and a bus 1406 that couples various system components including system memory 1404 to processing unit 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, software development module 110, import manager 112, importation indicator module 402, first subset determination module 404, dependency module 406, designation module 408, first selection determination module 410, first dependency determination module 412, second dependency determination module 414, hidden determination module 416, inquiry module 418, second selection determination module 420, importation module 422, element determination module 424, second subset determination module 426, operation indicator module 1102, dictionary generator 1104, consumption indicator module 1106, comparison module 1108, dependency determination module 1110, operation module 1112, user interface module 1114, inquiry module 1116, operation indicator module 1302, production indicator module 1304, index generator 1306, consumption indicator module 1308, comparison module 1310, dependency determination module 1312, flowchart 300 (including any step of flowchart 300), flowchart 600 (including any step of flowchart 600), flowchart 700 (including any step of flowchart 700), flowchart 800 (including any step of flowchart 800), flowchart 900 (including any step of flowchart 900), flowchart 1000 (including any step of flowchart 1000), and/or flowchart 1200 (including any step of flowchart 1200), as described herein.

A user may enter commands and information into the computer 1400 through input devices such as keyboard 1438 and pointing device 1440. Other input devices (not shown) may include a microphone, joystick, game pad, satellite dish, scanner, or the like. These and other input devices are often connected to the processing unit 1402 through a serial port interface 1442 that is coupled to bus 1406, but may be connected by other interfaces, such as a parallel port, game port, or a universal serial bus (USB).

A display device 1444 (e.g., a monitor) is also connected to bus 1406 via an interface, such as a video adapter 1446. In addition to display device 1444, computer 1400 may include other peripheral output devices (not shown) such as speakers and printers.

Computer 1400 is connected to a network 1448 (e.g., the Internet) through a network interface or adapter 1450, a modem 1452, or other means for establishing communications over the network. Modem 1452, which may be internal or external, is connected to bus 1406 via serial port interface 1442.

As used herein, the terms "computer program medium" and "computer-readable medium" are used to generally refer to media such as the hard disk associated with hard disk drive 1414, removable magnetic disk 1418, removable optical disk 1422, as well as other media such as flash memory cards, digital video disks, random access memories (RAMs), read only memories (ROM), and the like.

As noted above, computer programs and modules (including application programs 1432 and other program modules 1434) may be stored on the hard disk, magnetic disk, optical disk, ROM, or RAM. Such computer programs may also be received via network interface 1450 or serial port interface 1442. Such computer programs, when executed or loaded by an application, enable computer 1400 to implement features of embodiments discussed herein. Accordingly, such computer programs represent controllers of the computer 1400.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. CONCLUSION

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method of determining dependencies between elements of a computing software package based on a dictionary using one or more processors of a processor-based system, the method comprising:
   receiving an operation indicator that specifies that an operation is to be performed on a first element of a plurality of elements that are defined by a plurality of respective files that are included in the computing software package;
   generating, using at least one of the one or more processors, the dictionary that is stored on a computer database and that includes a plurality of indexes each of which has one or more values, at least one index of the plurality of indexes having a plurality of values, the plurality of indexes corresponding to a plurality of respective resources each of which is producible by at least one element of the plurality of elements that are defined by the plurality of respective files that are included in the computing software package, each value specifying an element of the plurality of elements that produces the resource that corresponds to the respective index;
   receiving a resource consumption indicator that specifies a designated resource of the plurality of resources that the first element consumes;
   comparing the resource consumption indicator to the plurality of indexes to match the resource consumption indicator to an index of the plurality of indexes that corresponds to the designated resource; and
   determining that the first element depends on a second element that produces the designated resource based on the index that corresponds to the designated resource having a value that specifies that the second element produces the designated resource.

2. The method of claim 1, wherein a first index of the plurality of indexes has a first plurality of values;
   wherein comparing the resource consumption indicator to the plurality of indexes comprises:
      comparing the resource consumption indicator to the plurality of indexes to match the resource consumption indicator to the first index which corresponds to the designated resource; and
   wherein determining that the first element depends on the second element comprises:
      determining that the first element depends on a plurality of second elements that produce the designated resource based on the first index having the first plurality of values that specify that the plurality of respective second elements produce the designated resource.

3. The method of claim 2, further comprising:
   providing a user interface that includes a visual representation of the computing software package, the user interface including a first indicator that specifies that the first element is selected for performance of the operation and at least one second indicator that specifies that at least one respective second element of the plurality of second elements is not selected for performance of the operation; and
   providing an inquiry in the user interface that inquires whether the at least one second element is to be selected for performance of the operation based on the first element being dependent on the at least one second element.

4. The method of claim 2, further comprising:
   performing the operation on the first element; and
   automatically performing the operation on the plurality of second elements based on the first element being dependent on the plurality of second elements.

5. The method of claim 4, wherein automatically performing the operation on the plurality of second elements comprises:
   automatically performing the operation on one or more second elements of the plurality of second elements further based on the one or more second elements being designated as one or more respective hidden selectable elements.

6. The method of claim 4, wherein automatically performing the operation on the plurality of second elements comprises:
   automatically performing the operation on one or more second elements of the plurality of second elements further based on the one or more second elements being designated as one or more respective non-selectable elements.

7. The method of claim 4, further comprising:
   receiving a second resource consumption indicator that specifies a second designated resource of the plurality of resources that one or more second elements of the plurality of second elements consume;
   comparing the second resource consumption indicator to the plurality of indexes to match the second resource consumption indicator to an index of the plurality of indexes that corresponds to the second designated resource;
   determining that the one or more second elements depend on a third element that produces the second designated resource based on the index that corresponds to the second designated resource having a value that specifies that the third element produces the second designated resource;

providing a user interface that includes a visual representation of the computing software package, the user interface including a first indicator that specifies that the first element is selected for performance of the operation and a second indicator that specifies that the third element is not selected for performance of the operation, the user interface not including one or more indicators that specify whether the one or more second elements are selected for performance of the operation in response to the one or more second elements being designated as one or more respective hidden selectable elements;

providing an inquiry in the user interface that inquires whether the third element is to be selected for performance of the operation based on the first element being dependent on the third element.

8. The method of claim 4, further comprising:

receiving a second resource consumption indicator that specifies a second designated resource of the plurality of resources that one or more second elements of the plurality of second elements consumes;

comparing the second resource consumption indicator to the plurality of indexes to match the second resource consumption indicator to an index of the plurality of indexes that corresponds to the second designated resource;

determining that the one or more second elements depend on a third element that produces the second designated resource based on the index that corresponds to the second designated resource having a value that specifies that the third element produces the second designated resource; and automatically performing the operation on the third element, based on the one or more second elements being dependent on the third element and further based on the third element being designated as a hidden selectable element or a non-selectable element, in response to performing the operation on the first element.

9. The method of claim 2, further comprising:

receiving a second resource consumption indicator that specifies that a third element consumes the designated resource;

comparing the second resource consumption indicator to the plurality of indexes to match the second resource consumption indicator to the first index which corresponds to the designated resource; and determining that the third element depends on the plurality of second elements based on the first index having the first plurality of values that specify that the plurality of respective second elements produce the designated resource.

10. The method of claim 2, wherein generating the dictionary comprises:

receiving at least one resource production indicator that specifies that the plurality of second elements produce the designated resource, the designated resource being a resource of a hierarchical resource structure;

generating the first index which corresponds to the designated resource and which has the first plurality of values that specify that the plurality of respective second elements produce the designated resource; and generating a second index for each resource of the hierarchical resource structure that includes the designated resource, each second index having a second plurality of values that specify that the plurality of respective second elements produce the respective resource of the hierarchical resource structure that includes the designated resource;

wherein receiving the resource consumption indicator comprises:

receiving the resource consumption indicator that specifies that the first element consumes a specified resource of the hierarchical resource structure that includes the designated resource;

wherein comparing the resource consumption indicator to the plurality of indexes comprises:

comparing the resource consumption indicator to the plurality of indexes to match the resource consumption indicator to the second index that corresponds to the specified resource; and wherein determining that the first element depends on the plurality of second elements comprises:

determining that the first element depends on the plurality of second elements based on the second index that corresponds to the specified resource having a second plurality of values that specify that the plurality of respective second elements produce the specified resource.

11. An import manager to determine dependencies between elements of a computing software package, the import manager comprising:

at least one element including at least one of (a) one or more processors or (b) hardware logic/electrical circuitry;

an operation indicator module configured to interpret an operation indicator that specifies that an operation is to be performed on a first element of a plurality of elements that are defined by a plurality of respective files that are included in the computing software package;

a dictionary generator, implemented using the at least one element, configured to generate a dictionary that is stored on a computer database and that includes a plurality of indexes each of which has one or more values, at least one index of the plurality of indexes having a plurality of values, the plurality of indexes corresponding to a plurality of respective resources each of which is producible by at least one element of the plurality of elements that are defined by the plurality of respective files that are included in the computing software package, each value specifying an element of the plurality of elements that produces the resource that corresponds to the respective index;

a consumption indicator module configured to interpret a resource consumption indicator that specifies a designated resource of the plurality of resources that the first element consumes;

a comparison module configured to compare the resource consumption indicator to the plurality of indexes to match the resource consumption indicator to an index of the plurality of indexes that corresponds to the designated resource; and a dependency determination module configured to determine that the first element depends on a second element that produces the designated resource based on the index that corresponds to the designated resource having a value that specifies that the second element produces the designated resource.

12. The method of claim 11, wherein a first index of the plurality of indexes has a first plurality of values;

wherein first index is the index of the plurality of indexes that corresponds to the designated resource; and wherein the dependency determination module is configured to determine that the first element depends on a plurality of second elements that produce the designated resource based on the first index having the first plurality of values that specify that the plurality of respective second elements produce the designated resource.

13. The import manager of claim 12, further comprising:
an interface module configured to provide a user interface that includes a visual representation of the computing software package, the user interface including a first indicator that specifies that the first element is selected for performance of the operation and at least one second indicator that specifies that at least one respective second element of the plurality of second elements is not selected for performance of the operation; and
an inquiry module configured to provide an inquiry in the user interface that inquires whether the at least one second element is to be selected for performance of the operation based on the first element being dependent on the at least one second element.

14. The import manager of claim 12, further comprising:
an operation module configured to perform the operation on the first element;
wherein the operation module is further configured to automatically perform the operation on the plurality of second elements, based on the first element being dependent on the plurality of second elements.

15. The import manager of claim 14, wherein the operation module is configured to automatically perform the operation on one or more second elements of the plurality of second elements further based on each of the one or more second elements being designated as a hidden selectable element or a non-selectable element.

16. The import manager of claim 14, wherein the consumption indicator module is further configured to interpret a second resource consumption indicator that specifies a second designated resource of the plurality of resources that one or more second elements of the plurality of second elements consume;
wherein the comparison module is further configured to compare the second resource consumption indicator to the plurality of indexes to match the second resource consumption indicator to an index of the plurality of indexes that corresponds to the second designated resource;
wherein the dependency determination module is further configured to determine that the one or more second elements depend on a third element that produces the second designated resource based on the index that corresponds to the second designated resource having a value that specifies that the third element produces the second designated resource; and
wherein the import manager further comprises:
an interface module configured to provide a user interface that includes a visual representation of the computing software package, the user interface including a first indicator that specifies that the first element is selected for performance of the operation and a second indicator that specifies that the third element is not selected for performance of the operation, the user interface not including one or more indicators that specify whether the one or more second elements are selected for performance of the operation in response to the one or more second elements being one or more respective hidden selectable elements;
an inquiry module configured to provide an inquiry in the user interface that inquires whether the third element is to be selected for performance of the operation based on the first element being dependent on the third element.

17. The import manager of claim 14, wherein the consumption indicator module is further configured to interpret a second resource consumption indicator that specifies a second designated resource of the plurality of resources that the one or more second elements of the plurality of second elements consume;
wherein the comparison module is further configured to compare the second resource consumption indicator to the plurality of indexes to match the second resource consumption indicator to an index of the plurality of indexes that corresponds to the second designated resource;
wherein the dependency determination module is configured to determine that the one or more second elements depend on a third element that produces the second designated resource based on the index that corresponds to the second designated resource having a value that specifies that the third element produces the second designated resource; and
wherein the import manager further comprises:
an operation module configured to automatically perform the operation on the third element, based on the one or more second elements being dependent on the third element and further based on the third element being a hidden selectable element or a non-selectable element, in response to performance of the operation on the first element.

18. The import manager of claim 12, wherein the consumption indicator is further configured to interpret a second resource consumption indicator that specifies that a third element consumes the designated resource;
wherein the comparison module is further configured to compare the second resource consumption indicator to the plurality of indexes to match the second resource consumption indicator to the first index which corresponds to the designated resource; and
wherein the dependency determination module is further configured to determine that the third element depends on the plurality of second elements based on the first index having the first plurality of values that specify that the plurality of respective second elements produce the designated resource.

19. The import manager of claim 12, wherein the dictionary generator comprises:
a production indicator module configured to interpret at least one resource production indicator that specifies that the plurality of second elements produce the designated resource, the designated resource is a resource of a hierarchical resource structure; and
an index generator configured to generate the first index which corresponds to the designated resource and which has the first plurality of values that specify that the plurality of respective second elements produce the designated resource;
wherein the index generator is further configured to generate a second index for each resource of the hierarchical resource structure that includes the designated resource, each second index having a second plurality of values that specify that the plurality of respective second elements produce the respective resource of the hierarchical resource structure that includes the designated resource;
wherein the consumption indicator module is configured to interpret the resource consumption indicator that specifies that the first element consumes a specified resource of the hierarchical resource structure that includes the designated resource;

wherein the comparison module is configured to compare the resource consumption indicator to the plurality of indexes to match the resource consumption indicator to the second index that corresponds to the specified resource; and wherein the dependency determination module is configured to determine that the first element depends on the plurality of second elements based on the second index that corresponds to the specified resource having a second plurality of values that specify that the plurality of respective second elements produce the specified resource.

20. A computer program product comprising a computer-readable hardware device having computer program logic recorded thereon for enabling a processor-based system to determine dependencies between elements of a computing software package, the computer program product comprising:

a first program logic module for enabling the processor-based system to interpret an operation indicator that specifies that an operation is to be performed on a first element of a plurality of elements that are defined by a plurality of respective files that are included in the computing software package;

a second program logic module for enabling the processor-based system to generate a dictionary that is stored on a computer database and that includes a plurality of indexes each of which has one or more values, the plurality of indexes corresponding to a plurality of respective resources each of which is producible by at least one element of the plurality of elements that are defined by the plurality of respective files that are included in the computing software package, each value specifying an element of the plurality of elements that produces the resource that corresponds to the respective index, a first index of the plurality of indexes having a first plurality of values;

a third program logic module for enabling the processor-based system to interpret a resource consumption indicator that specifies a designated resource of the plurality of resources that the first element consumes;

a fourth program logic module for enabling the processor-based system to compare the resource consumption indicator to the plurality of indexes to match the resource consumption indicator to the first index which corresponds to the designated resource; and a fifth program logic module for enabling the processor-based system to determine that the first element depends on a plurality of second elements that produce the designated resource based on the first index having the first plurality of values that specify that the plurality of respective second elements produce the designated resource.

* * * * *